United States Patent
Yamamoto

(10) Patent No.: US 8,983,965 B2
(45) Date of Patent: Mar. 17, 2015

(54) DOCUMENT RATING CALCULATION SYSTEM, DOCUMENT RATING CALCULATION METHOD AND PROGRAM

(75) Inventor: Kosuke Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 705 days.

(21) Appl. No.: 12/682,727

(22) PCT Filed: Oct. 10, 2008

(86) PCT No.: PCT/JP2008/068439
§ 371 (c)(1),
(2), (4) Date: May 26, 2010

(87) PCT Pub. No.: WO2009/048130
PCT Pub. Date: Apr. 16, 2009

(65) Prior Publication Data
US 2010/0257177 A1    Oct. 7, 2010

(30) Foreign Application Priority Data
Oct. 12, 2007  (JP) .................................. 2007-267147

(51) Int. Cl.
*G06F 17/30* (2006.01)

(52) U.S. Cl.
CPC ................................. *G06F 17/3061* (2013.01)
USPC ....................................................... 707/741

(58) Field of Classification Search
CPC .................................................. G06F 17/3061
See application file for complete search history.

(56) References Cited

U.S. PATENT DOCUMENTS

| | | | |
|---|---|---|---|
| 5,257,186 A * | 10/1993 | Ukita et al. | 715/259 |
| 5,469,354 A * | 11/1995 | Hatakeyama et al. | 707/999.003 |
| 5,819,253 A * | 10/1998 | Nihei | 707/999.001 |
| 5,943,669 A | 8/1999 | Numata | |
| 6,618,727 B1 * | 9/2003 | Wheeler et al. | 707/748 |

(Continued)

FOREIGN PATENT DOCUMENTS

| | | |
|---|---|---|
| JP | 06-301725 | 10/1994 |
| JP | 10-207911 | 8/1998 |
| JP | 2000-242647 | 9/2000 |

(Continued)

OTHER PUBLICATIONS

International Search Report, PCT/JP2008/068439, Jan. 13, 2009.

(Continued)

*Primary Examiner* — Dinku Gebresenbet
(74) *Attorney, Agent, or Firm* — Young & Thompson

(57) ABSTRACT

An item information database of a document rating calculation device stores a relation among items of a document and a rating for each item. A document retrieval unit retrieves a document fulfilling a retrieval condition, and, for condition items of the retrieval condition, specifies such item. A fulfilling-item set specifying unit selects a set of related items for each of items fulfilling the condition items of the retrieval condition, in the document retrieved by the document retrieval unit, based on the mutual relation among the items stored in the item information database, and performs a logical operation of the retrieval condition between selected sets of related items to specify a set of fulfilling items. A score calculator calculates a document rating of the retrieved document from the ratings of items in the set of fulfilling items specified by the fulfilling-item set specifying unit and stored in the item information database.

39 Claims, 39 Drawing Sheets

(56) References Cited

U.S. PATENT DOCUMENTS 6,654,742 B1 11/2003 Kobayashi et al.
2003/0018631 A1* 1/2003 Lipson et al. .................. 707/3

FOREIGN PATENT DOCUMENTS

| | | |
|---|---|---|
| JP | 2000-250930 | 9/2000 |
| JP | 2000-330979 | 11/2000 |
| JP | 2002-342379 | 11/2002 |
| JP | 2003-271619 | 9/2003 |
| JP | 2004-272871 | 9/2004 |
| JP | 2005-301855 | 10/2005 |

OTHER PUBLICATIONS

JP Office Action dated Sep. 25, 2012, with partial English translation; Application No. 2009-537039.

* cited by examiner

FIG.4

DOCUMENT INFORMATION

| DOCUMENT ID | DOCUMENT NAME | DOCUMENT SAVING LOCATION | ... |
|---|---|---|---|
| D001 | aaa.doc | /ppt_box/fs1/ | |
| D002 | bbb.ppt | /ppt_box/fs2/ | |
| D003 | ccc.txt | /ppt_box/pc1/ | |
| D004 | ddd.doc | /ppt_box/pc2/ | |
| : | : | : | |

FIG.5

TITLE

TABLE OF CONTENTS
SECTION 1 ***
SECTION 1.1 ***
SECTION 1.2 ***
SECTION 2 ***
SECTION 2.1 ***
SECTION 2.2 ***

SECTION 1 ***
SECTION 1.1 *** FIGURE
SECTION 1.2 ***
SECTION 2 ***
SECTION 2.1 *** TABLE
SECTION 2.2 ***

FIG.6

No.1 — TITLE

No.2 — TABLE OF CONTENTS

No.3 — SECTION 1 ***

No.4 — SECTION 1.1 *** FIGURE

No.5 — SECTION 1.2 ***

No.6 — SECTION 2 ***

No.7 — SECTION 2.1 *** TABLE

No.8 — SECTION 2.2 ***

| ITEM | NUMBER OF FIGURES | NUMBER OF TABLES | NUMBER OF SENTENCES | NUMBER OF EMPHASIS EXPRESSION | NUMBER OF CITATION | NUMBER OF IMPORTANT KEY WORDS | AREA OF SCRIPT | AREA OF FIGURE /TABLE |
|---|---|---|---|---|---|---|---|---|
| SECTION 1 | 1 | 1 | 5 | 1 | 0 | 0 | 0.3 | 0.3 |

FIG.9

ITEM-BY-ITEM DOCUMENT INFORMATION

| ITEM ID | DOCUMENT ID | TEXT INFORMATION | CONTENT INFORMATION | | | |
|---|---|---|---|---|---|---|
| | | | NUMBER OF FIGURES | NUMBER OF TABLES | NUMBER OF SENTENCES | ... |
| P001 | D001 | TITLE | 0 | 0 | 1 | ... |
| P002 | D001 | TABLE OF CONTENTS | 0 | 0 | 7 | ... |
| P003 | D001 | SECTION 1 ... | 1 | 0 | 4 | ... |
| P004 | D001 | SECTION 1.1 ... | 0 | 0 | 3 | ... |
| P005 | D001 | SECTION 1.2 ... | 0 | 0 | 7 | ... |
| P006 | D001 | SECTION 2 ... | 0 | 0 | 5 | ... |
| P007 | D001 | SECTION 2.1 ... | 0 | 1 | 8 | ... |
| P008 | D001 | SECTION 2.2 ... | 0 | 0 | 3 | ... |
| : | : | : | : | : | : | : |

FIG.12

SUBORDINATE ITEM INFORMATION

| ITEM ID | DOCUMENT ID | HEAD | SUBORDINATE ITEM |
|---|---|---|---|
| P001 | D001 | TITLE | 11111111 |
| P002 | D001 | TABLE OF CONTENTS | 01000000 |
| P003 | D001 | SECTION 1 *** | 00111000 |
| P004 | D001 | SECTION 1.1 *** | 00010000 |
| P005 | D001 | SECTION 1.2 *** | 00001000 |
| P006 | D001 | SECTION 2 *** | 00000111 |
| P007 | D001 | SECTION 2.1 *** | 00000010 |
| P008 | D001 | SECTION 2.2 *** | 00000001 |
| : | : | : | : |

SUBORDINATE ITEM INFORMATION

| ITEM ID | DOCUMENT ID | HEAD | SUBORDINATE ITEM |
|---|---|---|---|
| P501 | D201 | TITLE | 1111111111 |
| P502 | D201 | TABLE OF CONTENTS | 0100000000 |
| P503 | D201 | SECTION 1 *** | 0011100000 |
| P504 | D201 | SECTION 1.1 *** | 0001000101 |
| P505 | D201 | SECTION 1.2 *** | 0000100010 |
| P506 | D201 | SECTION 2 *** | 0001010100 |
| P507 | D201 | APPENDIX A *** | 0000001110 |
| P508 | D201 | APPENDIX A.1 *** | 0001010100 |
| P509 | D201 | APPENDIX A.2 *** | 0000100010 |
| P510 | D201 | APPENDIX B *** | 0001000001 |

FIG.14

SUBORDINATE ITEM INFORMATION

| ITEM ID | DOCUMENT ID | HEAD | SUBORDINATE ITEM | |
|---------|-------------|------|------------------|---|
| P001 | D001 | TITLE | 10111111 | ← 511 |
| P002 | D001 | TABLE OF CONTENTS | 00000000 | ← 512 |
| P003 | D001 | SECTION 1 *** | 00111000 | |
| P004 | D001 | SECTION 1.1 *** | 00010000 | |
| P005 | D001 | SECTION 1.2 *** | 00001000 | |
| P006 | D001 | SECTION 2 *** | 00000111 | |
| P007 | D001 | SECTION 2.1 *** | 00000010 | |
| P008 | D001 | SECTION 2.2 *** | 00000001 | |
| : | : | : | : | |

FIG.15

| VARIABLE | CONTENT INFORMATION |
|---|---|
| c1 | NUMBER OF FIGURES |
| c2 | NUMBER OF TABLES |
| c3 | NUMBER OF SENTENCES |
| c4 | NUMBER OF EMPHASIS EXPRESSION |
| c5 | NUMBER OF CITATIONS (NUMBER OF URLS OR THE LIKE) |
| c6 | NUMBER OF IMPORTANT KEY WORDS |
| c7 | BALANCE BETWEEN DOCUMENT AND FIGURE/TABLE |

FIG.16

| CONTENT INFORMATION | WEIGHT | VALUE |
|---|---|---|
| NUMBER OF FIGURES | w1 | 1 |
| NUMBER OF TABLES | w2 | 1 |
| NUMBER OF SENTENCES | w3 | 0.1 |
| NUMBER OF EMPHASIS EXPRESSION | w4 | 0.5 |
| NUMBER OF CITATIONS (NUMBER OF URLS OR THE LIKE) | w5 | 0.2 |
| NUMBER OF IMPORTANT KEY WORDS | w6 | 0.2 |
| BALANCE BETWEEN DOCUMENT AND FIGURE/TABLE | w7 | 1 |

FIG.17

ITEM INFORMATION

| ITEM ID | DOCUMENT ID | HEAD | SUBORDINATE ITEM | RATING OF ITEM |
|---|---|---|---|---|
| P001 | D001 | TITLE | 10111111 | 1 |
| P002 | D001 | TABLE OF CONTENTS ··· | 00000000 | 2 |
| P003 | D001 | SECTION 1 ··· | 00111000 | 2 |
| P004 | D001 | SECTION 1.1 ··· | 00010000 | 5 |
| P005 | D001 | SECTION 1.2 ··· | 00001000 | 2 |
| P006 | D001 | SECTION 2 ··· | 00000111 | 1 |
| P007 | D001 | SECTION 2.1 ··· | 00000010 | 4 |
| P008 | D001 | SECTION 2.2 ··· | 00000001 | 1 |
| ⋮ | ⋮ | ⋮ | ⋮ | ⋮ |

FIG.18

RETRIEVAL RESULTS
ON "SECURITY"

| ITEM ID | DOCUMENT ID |
|---------|-------------|
| P003    | D001        |
| P008    | D001        |
| P009    | D002        |
| P012    | D003        |
| P104    | D005        |
| :       | :           |

RETRIEVAL RESULTS
ON "MARKET TREND"

| ITEM ID | DOCUMENT ID |
|---------|-------------|
| P004    | D001        |
| P011    | D003        |
| P024    | D004        |
| P036    | D004        |
| P110    | D005        |
| :       | :           |

FIG.19

RETRIEVAL RESULTS

| DOCUMENT ID | RETRIEVAL ITEM | ITEM ID |
|---|---|---|
| D001 | SECURITY | P003, P008 |
| | MARKET TREND | P004 |
| D003 | SECURITY | P012 |
| | MARKET TREND | P011 |
| D005 | SECURITY | P104 |
| | MARKET TREND | P110 |
| : | | |

FIG.22

FULFILLING-ITEM SET INFORMATION

| DOCUMNET ID | FULFILLING ITEM SET |
|---|---|
| D001 | P004 |
| D003 | P012, P013, P014, P015 |
| D005 | |
| : | : |

FIG.28

1-20 of 1,000 hits in retrieval results on "security market trend"

518 ←Previous Results  Next Results→  517

[Table of Contents] Survey Material on Security [Section 1.1 Market Trend]
The trend of technical development on security, market price forecasting on security, survey and analysis on market trend in ... industry from 2003 to 2010, ...

[Table of Contents] Present State of Security Network [Chapter 2 Change in Market]
Analysis is made on the latest trend in the European and American communication markets in which there are movements of introduction of the entry of FMC, IPTV and Quadruple Play services, which are expected as Japanese security services, entry of MVNO or the like into the communication market, introduction of the wireless broadband typified by WiMAX, and fusion with network by Web 2.0, ...

[Table of Contents] Companies/Business in NGN Age [Chapter 1 Trend of Market]
Products reporting the latest techniques on security are provided to help clients to create new company values and reinforce company foundation, ..., market trend and expansion of ... by ubiquitousness, ..., information technoligy (IT) over the past several years ...

[Table of Contents] Security and New Related Market [Section 1.2 What is Security]
It is necessary to make explotation of new markets through development of .... This survey covers the trend on security, and approaches of major carriers, ... Market trend on related communication devices, ... the related markets have risen since 2007, and will be grown up into real markets from 2080.

FIG.34

REFERENCE HISTORY INFORMATION

| TIME | RETRIEVAL CONDITION | DOCUMENT ID | SEARCHER |
|---|---|---|---|
| 2007/05/29 10:00:00 | network | D004 | U1 |
| 2007/05/29 10:01:00 | security AND market trend | D001 | U2 |
| 2007/05/29 10:02:00 | ... | D001 | U3 |
| 2007/05/29 10:03:00 | ... | D003 | U4 |
| 2007/05/29 10:04:00 | ... | D004 | U2 |
| 2007/05/29 10:05:00 | ... | D001 | U3 |
| 2007/05/29 10:06:00 | ... | D002 | U5 |
| 2007/05/29 10:07:00 | ... | D007 | U3 |
| 2007/05/29 10:08:00 | ... | D009 | U2 |
| : | | : | : |

FIG.35
REFERENCE HISTORY INFORMATION
| TIME | DOCUMENT ID | 520 |
|---|---|---|
| 2007/05/29 10:00:00 | D003 | |
| 2007/05/29 10:00:00 | D004 | |
| 2007/05/29 10:01:00 | D001 | |
| 2007/05/29 10:01:00 | D004 | |
| 2007/05/29 10:02:00 | D002 | |
| 2007/05/29 10:02:00 | D004 | |
| 2007/05/29 10:03:00 | D002 | |
| 2007/05/29 10:04:00 | D005 | |
| 2007/05/29 10:05:00 | D001 | |
RETRIEVAL RESULTS : D001, D002, D003
REFERENCE HISTORY INFORMATION
RELATING TO RETRIEVAL RESULTS
| TIME | DOCUMENT ID | 521 |
|---|---|---|
| 2007/05/29 10:00:00 | D003 | |
| 2007/05/29 10:01:00 | D001 | |
| 2007/05/29 10:02:00 | D002 | |
| 2007/05/29 10:03:00 | D002 | |
| 2007/05/29 10:04:00 | D001 | |
| 2007/05/29 10:05:00 | D001 | |
| DOCUMENT ID | REFERENCE SCORE | 522 |
|---|---|---|
| D001 | 3 | |
| D002 | 2 | |
| D003 | 1 | |

FIG.36

REFERENCE HISTORY INFORMATION
RELATING TO RETRIEVAL RESULTS

| TIME | RETRIEVAL CONDITION | DOCUMENT ID |
|---|---|---|
| 2007/05/29 10:00:00 | security AND market trend | D003 |
| 2007/05/29 10:01:00 | security AND network | D001 |
| 2007/05/29 10:02:00 | security AND market trend | D002 |
| 2007/05/29 10:03:00 | security AND market trend | D002 |
| 2007/05/29 10:04:00 | security AND network | D001 |
| 2007/05/29 10:05:00 | security AND environmental forecasting | D001 |

523

RETRIEVAL CONDITION : security AND market trend

⇩

REFERENCE HISTORY INFORMATION
RELATING TO RETRIEVAL QUERY

| TIME | RETRIEVAL CONDITION | DOCUMENT ID |
|---|---|---|
| 2007/05/29 10:00:00 | security AND market trend | D003 |
| 2007/05/29 10:02:00 | security AND market trend | D002 |
| 2007/05/29 10:03:00 | security AND market trend | D002 |

524

⇨

| DOCUMENT ID | REFERENCE SCORE |
|---|---|
| D001 | 0 |
| D002 | 2 |
| D003 | 1 |

525

DOCUMENT RATING CALCULATION SYSTEM, DOCUMENT RATING CALCULATION METHOD AND PROGRAM

TECHNICAL FIELD

The present invention relates to a document rating calculation system, document rating calculation method, and program, which calculate the rating of a document to be an index for the degree of fulfilling a retrieval condition.

BACKGROUND ART

We have been able to access a lot of information using the Internet, intranet or the like. However, as information to be accessible increases, it becomes more difficult to efficiently acquire only necessary information. Therefore, there is a demand for a system which can adequately retrieve documents containing necessary information. Recently, for commonly or the like sharing information within an organization, companies which use systems capable of retrieving intra-office documents (e.g., materials created by Microsoft Office products or the like) are increasing.

A document retrieval system retrieves documents which fulfill the retrieval condition input by a searcher from a database storing documents. Then, the document retrieval system displays the retrieval results arranged in the order of the relevancy to the retrieval condition from one which is judged to have a higher relevancy by the document retrieval system. The retrieval condition is a key for document retrieval which is input to the document retrieval system, and is generally described by key words and a method of a logical operation on the key words. As a searcher designates the logical operation method, the searcher can designate targets to be retrieved by the document retrieval system, such as a document containing all the key words, a document containing one of the key words, or a document which does not contain a specific key word. The process of arranging documents in the order of the relevancy to the retrieval condition from one which has a higher relevancy is called "ranking", and the order obtained by ranking is called "rank".

Ranking is important in the document retrieval system. Searchers need a considerable time and efforts to view all the documents in the retrieval results. Therefore, most of the searches view only documents which are ranked high, and perform retrieval again under a different retrieval condition if there is desired information. That is, documents which are ranked low have a significance for a searcher only in the number of documents which are found in the retrieval, and appear as being nonexistent. Therefore, there is a demand for a document rating calculating technique for making documents needed by the searcher ranked higher.

The quantization of the rating of a document is called "scoring", and a quantized value obtained by scoring is called "score". Scoring methods are roughly separated into three classifications. (1) A method which uses information in a document, (2) a method which uses information outside a document, and (3) a method which uses the operational history of a searcher. According to the method 1, the rating of a document is calculated based on the amount of inclusion of a character string given as the retrieval condition, the uniqueness of the character string in the retrieval condition, the relation of common occurrence between the character string and a character string in a document, the number of links to another document, and so forth. According to the method 2, the rating of a document is calculated based on the depth of the directory where a document is present, the date of creation of a document, the update date or the update frequency thereof, etc. According to the method 3, the rating of a document is calculated based on the number of references made by the searcher, the revisiting history and the like. In addition, those methods 1 to 3 may be combined. Since the method 1 involves scoring based on the contents of documents, it is easier to reflect the relevancy between a retrieval condition and a document on ranking as compared with the methods 2 and 3. The following will describe a technique related to the method 1.

One example of the document rating calculating technique is described in Patent Literature 1. The "method and system for retrieving related information" described in Patent Literature 1 determines the rating of a document according to a plurality of criteria for sequencing. Even in a case where the rating of a document becomes a low value in one scoring, if the document is ranked higher according to another criterion, it becomes easier for a searcher to find a necessary document. Further, the general rating of documents is calculated by obtaining the document size, the document update frequency, the number of links included, the ratio of key words contained, the number of related key words, the date of document creation, and the like are used as criteria for the ratings. In addition, the document size, the document update frequency, the date of document creation, and the like, which correspond to the method 2, are used as criteria for the ratings.

One example of other document rating calculating techniques is described in Patent Literature 2. The "method for analyzing electronic document to be retrieved and electronic document registration system" described in Patent Literature 2 extracts table-of-contents information contained in a document, divides the body item by item in the table of contents, and registers the body segments. As a document is divided into items, the contents which fulfill a retrieval condition can be retrieved item by item. Although this system does not have a process of calculating the rating of a document, it is regarded as an existing technique for calculating document ratings item by item.

Patent Literature 3 describes a character string retrieval device which performs fuzzy retrieval of a plurality of documents having a set of documents hierarchized in one or more levels, or two or more levels. Fuzzy retrieval includes a character string in a document which does not exactly coincide with a specific character string in retrieval results. All character strings in a document are searched for a specific character string, and their degrees of coincidence are determined. The degrees of coincidence mean the degrees of coincidence of a character string given as a retrieval condition with character strings in the document. The degrees of coincidence of character string sets in each level are totaled in order from the lowest level for each document, and the highest degree of coincidence is considered as the degree of coincidence for that level. Further, the degree of coincidence in the topmost level in each of the documents is considered as the degree of coincidence of that document. That is, the technique of Patent Literature 3 can be said as a technique of specifying how much each item coincides with a retrieval item.

Patent Literature 4 describes that the average result score of a partial set of other documents having utilization information including the utilization information of a document is defined as an expected score. Patent Literature 4 describes that a document score is calculated by the combination weighting the result score and the expected score with the respective significance degrees according to the size of the partial set. The document ranking system of Patent Literature 4 ranks of document sets whose retrieval is requested by a user by using the document scores of the individual documents in the document score database. The technique of Patent Literature 4 is basically equivalent to the method 3 of using the operational history, however, the technique of Patent Literature 4 is regarded as a technique of correcting the rating of a document with information outside the document.

Patent Literature 5 describes that a retrieval device using index data is used together to perform document retrieval by determining an important word based on both the importance level of each word alone which is extracted by a systematic scheme, and the importance level of a word in a specific context.

Patent Literature 6 describes that a scale expression word is extracted from an input text by referring to a set of scale expression words as words of an attribute which can have a quantitative value. Patent Literature 6 also describes that a word corresponding to one of a word which is contiguous to the extracted scale expression word to form a compound word, a word modifying the extracted scale expression word, and a word which is modified by a phrase containing the extracted scale expression word is extracted as a scale expression related word. At the time a key word is weighted, a weight calculated based on a preset calculation method is imparted to the scale expression word or the scale expression related word.

Patent Literature 1: Unexamined Japanese Patent Application KOKAI Publication No. 2000-242647
Patent Literature 2: Unexamined Japanese Patent Application KOKAI Publication No. 2000-330979
Patent Literature 3: Unexamined Japanese Patent Application KOKAI Publication No. H06-301725
Patent Literature 4: Unexamined Japanese Patent Application KOKAI Publication No. 2002-342379
Patent Literature 5: Unexamined Japanese Patent Application KOKAI Publication No. 2003-271619
Patent Literature 6: Unexamined Japanese Patent Application KOKAI Publication No. 2005-301855

DISCLOSURE OF THE INVENTION

Problems to be Solved by the Invention

The methods described in Patent Literatures 1 to 6 cannot calculate the rating of a document based on an abundance of substantial contents relating to a retrieval condition. The abundance of substantial contents is the amount of illustrative sentences, figures, tables and so forth which fulfill a retrieval condition and contained in one or more specific ranges in a document. The specific ranges are a chapter and a section in a document, for example.

The method described in Patent Literature 1 performs ranking based on a plurality of criteria, or combines the ranks. However, information needed by a searcher is often a portion of a document. Even if a score is calculated based on information on the overall document, therefore, the score and the necessary information may not be correlated with each other. A document of several pages containing only information needed by a searcher is often useful for the searcher, rather than a document of over several hundred pages containing information needed by a searcher only in a very small portion. Searching the overall document compels a searcher to view chapters and sections which are not relevant to the information needed by the searcher. Accordingly, the method described in Patent Literature 1 is not quite convenient for a searcher.

The method described in Patent Literature 2 registers a document broken down according to the table of contents, thus permitting the document to be accessed chapter by chapter or section by section. However, with a document merely broken down to merely specify a portion containing a character string equivalent to a retrieval condition, it is not possible to adequately specify how much related portions are present. With regard to a word already explained in an early section of a document, for example, a character string itself may not be written clearly when the middle section or the last section is apparently related to that word. There also is a case where when one word appears, an abbreviation, alias or the like is used as in the form of "hereinafter called ○○" to simplify a document. In such a case, while a word which has appeared first in a document coincides with a key word in a retrieval condition, an abbreviation or alias appearing thereafter does not.

The method described in Patent Literature 3 can specify an item which coincides with each retrieval item of a retrieval condition, but cannot uniquely specify a set of items with intended contents of the retrieval condition. Let us consider a document which has a hierarchical structure with Section 1.1 and Section 1.2 positioned under Section 1. Suppose that the head of Section 1 is "security" and the head of Section 1.1 is "market trend". When a searcher who wants to examine the market trend of security inputs a retrieval condition "security AND market trend", Section 1.1 should properly be the range that fulfills the retrieval condition. According to the method described in Patent Literature 3, however, it is understood that the retrieval item "security" coincides with the head of Section 1 and the retrieval item "market trend" coincides with the head of Section 1.1, but there is not any way to specify that Section 1.1 is the range that fulfills the retrieval condition. This is originated from the facts that the related art is not intended to specify an item fulfilling a retrieval condition, and that the implicit rule that the contents of a higher class in the hierarchical structure of a document comprehends the contents of lower classes is not considered in specifying an item fulfilling a retrieval condition. In addition, since the method described in Patent Literature 3 is premised on its application to a document having a hierarchical structure, the method cannot be applied to a document having an other structure than the hierarchical structure.

Since the method described in Patent Literature 4 is based on the state of the usage of a document, which is equivalent to the date of creation of a document, the update date, the update frequency thereof or the like in (2), for example, it cannot specify the range in a document which relates to a retrieval condition.

Further, the method described in Patent Literature 5 calculates the importance level of a document in consideration of importance level of a word in a specific context. It is however difficult to determine a specific context beforehand. Even if a specific context is determined beforehand, it is not possible to estimate the size of the range in the document where information on the contents a searcher wants to examine is described. This is because no consideration is given of to what range of sentences the sentence that contains the context is related.

The method described in Patent Literature 6 facilitates retrieval of a document containing a scale expression word or a word of an attribute which can have a quantitative value, and a scale expression related word related to the scale expression word. Generally, however, information needed by a searcher may not be a document containing a lot of scale expression words. In addition, how extensively the substantial contents relating to a retrieval condition occupy a document is not considered at all in calculation of the rating of the document. The method described in Patent Literature 6 considers only a local sentence structure, such as contiguousness to scale expression words or modification thereof. Therefore, the method described in Patent Literature 6 cannot judge how much the substantial contents relating to a retrieval condition occupy the document.

It is an object of the present invention to allow a searcher to easily access a document containing required information by calculating the rating of the document based on an abundance of substantial contents for a retrieval condition.

Means for Solving the Problems

A document rating calculation system according to a first aspect of the invention includes:

an item information database that stores a mutual relation among items into which a document is divided and a rating for each of the items which is calculated based on a predetermined criterion;

document retrieval means that retrieves a document fulfilling a given retrieval condition, and, for each condition item of the retrieval condition, specifies an item fulfilling the condition item in the retrieved document;

related item selection means that selects a set of related items for each item fulfilling the condition item of the retrieval condition and specified by the document retrieval means in the document retrieved by the document retrieval means, based on the mutual relation among the items which is stored in the item information database;

fulfilling-item set specifying means that performs a logical operation of the retrieval condition between sets of related items selected by the related item selection means to specify a set of items fulfilling the retrieval condition; and score calculation means that calculates a document rating of the document fulfilling the retrieval condition based on the ratings of items stored in the item information database and included in the set of fulfilling items specified by the fulfilling-item set specifying means.

Preferably, for each item included in a document having a hierarchical structure of items, the item information database stores, as the mutual relation among the items, a subordinate item set which is a set of items included in a lower class in the hierarchical structure and including that each item as a top, and for each item fulfilling the condition item of the retrieval condition, the related item selection means selects that item and the subordinate item set thereof as a set of related items.

Further, for each item included in a document having a hierarchical structure of items, the subordinate item set may include an arbitrary item besides a subordinate item included in a lower class in the hierarchical structure and including that each item as a top.

Preferably, the item information database uses a bit array having bits assigned to all items included in the document to store a set of related items relating to each of the items as a value of a bit assigned to the item.

When the logical operation for the condition item of the retrieval condition includes a NOT operation, the document retrieval means may not exclude a document which includes a condition item to be subjected to the NOT operation and another condition item from a selection target of the related item selection means.

Preferably, the score calculation means sets a sum of ratings of items included in a set of related items fulfilling the retrieval condition and stored in the item information database to a document rating of a document fulfilling the retrieval condition.

Alternatively, the score calculation means may set an average value obtained by dividing a sum of ratings of items included in a set of related items fulfilling the retrieval condition and stored in the item information database by a number of items in the set of related items fulfilling the retrieval condition to a document rating of a document fulfilling the retrieval condition.

Alternatively, the score calculation means may set a ratio of a sum of ratings of items included in a set of related items fulfilling the retrieval condition and stored in the item information database to a total of ratings of all items in the document to a document rating of a document fulfilling the retrieval condition.

Further, the document rating calculation system may include:

item extraction means that extracts character strings corresponding to individual heads in a table of contents included in the document from the document, and divides the document into items corresponding to the heads; and item relation setting means that specifies a hierarchical relation among the items based on text information, positional information or decoration information of each item in the table of contents, or a combination of those information.

Further, the document rating calculation system may include necessary item determining means that specifies a predetermined item in the document which does not influence the document rating of the document, and excludes the item from candidates whose document ratings are to be calculated.

Preferably, the item information database uses a bit array having bits assigned to all items included in the document to store a set of related items relating to each of the items as a value of a bit assigned to the item, and the necessary item determining means changes a bit in the bit array which corresponds to an item which does not influence a rating of a document to a value indicating that the bit is not used in calculation of the document rating.

The item information database may store a value calculated based on a predetermined degree of account for a number of elements included in an item of the document and a type of the elements, as the rating of the item.

In this case, the types of elements included in the items of the document can include any combination of a sentence, a figure, a table, an equation, an emphasis expression, a citation and a key word, and the item information database can store a value calculated based on a sum of product of a number of elements for each of the types of the elements included in the items of the document, a predetermined index for each of the types of the elements, and a predetermined weight set for the index, as a rating for each of the items.

Further, the score calculation means may set a sum of ratings of items included in a set of related items fulfilling the retrieval condition and stored in the item information database to a document rating of a document fulfilling the retrieval condition, and calculates a specialty level which is a ratio of the document rating to a sum of ratings of the all the items of the document, and the document rating calculation system may include specialty level outputting means that displays a position of a document fulfilling the retrieval condition on a two-dimensional coordinate plane having the document rating and the specialty level on axes, based on the document rating and the specialty level.

Preferably, the item information database stores a document reference history for each document, and the document rating calculation system comprises:

reference score calculation means that calculates a reference rating of a document based on the reference history of a document fulfilling the retrieval condition which is retrieved by the retrieval means; and score integration means that integrates the document rating calculated by the score calculation means and the reference rating calculated by the reference score calculation means to calculate an integrated rating of the document.

Further, the score calculation means may calculate the document rating based on a sum of ratings of items included in a set of related items fulfilling the retrieval condition and stored in the item information database, the reference score calculation means may calculate the reference rating based on a number of times the document has been referred, and the score integration means may calculate the integrated rating by multiplying values of the document rating and the reference rating that are respectively normalized with predetermined criteria by a weight, and adding the weighted values.

Alternatively, the score calculation means may calculate the document rating based on a sum of ratings of items included in a set of related items fulfilling the retrieval condition and stored in the item information database, the reference score calculation means may calculate the reference rating based on a number of times the document has been referred, and the score integration means may calculate the integrated rating by multiplying values of the document rating and the reference rating that are respectively normalized with predetermined criteria by a weight which changes according to a creation time of the document, and adding the weighted values.

Further, the score calculation means may calculate the document rating based on a sum of ratings of items included in a set of related items fulfilling the retrieval condition and stored in the item information database, the reference score calculation means may calculate the reference rating based on a number of times the document has been referred, and the document rating calculation system may include specialty level outputting means that displays a position of a document fulfilling the retrieval condition on a two-dimensional coordinate plane having the document rating and the reference rating on axes, based on the document rating and the reference rating.

A document rating calculation method according to a second aspect of the invention includes:

a document retrieval step of retrieving a document fulfilling a given retrieval condition from a database for documents divided into items, and, for each condition item of the retrieval condition, specifying an item fulfilling the condition item in the retrieved document;

a related item selection step of selecting a set of related items for each item fulfilling the condition item of the retrieval condition and specified in the document retrieval step, based on a mutual relation among items which is stored in an item information database storing a mutual relation among items into which a document is divided and a rating for each of the items which is calculated based on a predetermined criterion;

a fulfilling-item set specifying step of performing a logical operation of the retrieval condition between sets of related items selected in the related item selection step to specify a set of items fulfilling the retrieval condition; and a score calculation step of calculating a document rating of the document fulfilling the retrieval condition based on the ratings of items stored in the item information database and included in the set of fulfilling items specified in the fulfilling-item set specifying step.

Preferably, for each item in a document having a hierarchical structure of items and fulfilling the condition item of the retrieval condition, the related item selection step selects, as the set of related items, a subordinate item set which is a set of items included in a lower class in the hierarchical structure and including that each item as a top.

The related item selection step can include an arbitrary item besides a subordinate item included in a lower class in the hierarchical structure and including that each item as a top, as the set of related items for each item fulfilling the condition item of the retrieval condition.

The related item selection step uses the mutual relation among the items, which is represented by a value of a bit array having bits assigned to all items included in the document to select a set of related items relating to each of the items fulfilling the condition item of the retrieval condition.

When the logical operation for the condition item of the retrieval condition includes a NOT operation, the document retrieval step may not exclude a document which includes a condition item to be subjected to the NOT operation and another condition item from a selection target in the related item selection step.

The score calculation step sets a sum of ratings of items included in a set of related items fulfilling the retrieval condition and stored in the item information database to a document rating of a document fulfilling the retrieval condition.

Alternatively, the score calculation step sets an average value obtained by dividing a sum of ratings of items included in a set of related items fulfilling the retrieval condition and stored in the item information database by a number of items in the set of related items fulfilling the retrieval condition to a document rating of a document fulfilling the retrieval condition.

Alternatively, the score calculation step sets a ratio of a sum of ratings of items included in a set of related items fulfilling the retrieval condition and stored in the item information database to a total of ratings of all items in the document to a document rating of a document fulfilling the retrieval condition.

The document rating calculation method may include:

an item extraction step of extracting character strings corresponding to individual heads in a table of contents included in the document from the document, and dividing the document into items corresponding to the heads; and an item relation setting step of specifying a hierarchical relation among the items based on text information, positional information or decoration information of each item in the table of contents, or a combination of those information.

The document rating calculation method may include a necessary item determining step of specifying a predetermined item in the document which does not influence the document rating of the document, and excluding the item from candidates whose document ratings are to be calculated.

The necessary item determining step may change a bit corresponding to an item which does not influence a rating of a document and included in a bit array having bits assigned to all items included in the document, to a value indicating that the bit is not used in calculation of the document rating.

The score calculation step may calculate a document rating of a document fulfilling the retrieval condition based on a rating calculated based on a predetermined degree of account for a number of elements included in an item of the document and a type of the elements.

The types of elements included in the items of the document may include any combination of a sentence, a figure, a table, an equation, an emphasis expression, a citation and a key word, and the score calculation step may calculate a document rating of a document fulfilling the retrieval condition based on a rating calculated based on a sum of product of a number of elements for each of the types of the elements included in the items of the document, a predetermined index for each of the types of the elements, and a predetermined weight set for the index.

The score calculation step may set a sum of ratings of items included in a set of related items fulfilling the retrieval condition and stored in the item information database to a document rating of a document fulfilling the retrieval condition, and calculate a specialty level which is a ratio of the document rating to a sum of ratings of the all the items of the document, and the document rating calculation method may include a specialty level outputting step of displaying a position of a document fulfilling the retrieval condition on a two-dimensional coordinate plane having the document rating and the specialty level on axes, based on the document rating and the specialty level.

The item information database may store a document reference history for each document, and the document rating calculation method may include:

a reference score calculation step of calculating a reference rating of a document based on the reference history of a document fulfilling the retrieval condition which is retrieved in the retrieval step; and a score integration step of integrating the document rating calculated in the score calculation step and the reference rating calculated in the reference score calculation step to calculate an integrated rating of the document.

The score calculation step may calculate the document rating based on a sum of ratings of items included in a set of related items fulfilling the retrieval condition and stored in the item information database, the reference score calculation step may calculate the reference rating based on a number of times the document has been referred, and the score integration step may calculate the integrated rating by multiplying values of the document rating and the reference rating that are respectively normalized with predetermined criteria by a weight, and adding the weighted values.

The score calculation step may calculate the document rating based on a sum of ratings of items included in a set of related items fulfilling the retrieval condition and stored in the item information database, the reference score calculation step may calculate the reference rating based on a number of times the document has been referred, and the score integration step may calculate the integrated rating by multiplying values of the document rating and the reference rating that are respectively normalized with predetermined criteria by a weight which changes according to a creation time of the document, and adding the weighted values.

The score calculation step may calculate the document rating based on a sum of ratings of items included in a set of related items fulfilling the retrieval condition and stored in the item information database, the reference score calculation step may calculate the reference rating based on a number of times the document has been referred, and the document rating calculation system may include a specialty level outputting step of displaying a position of a document fulfilling the retrieval condition on a two-dimensional coordinate plane having the document rating and the reference rating on axes, based on the document rating and the reference rating.

A program according to a third aspect of the invention allows a computer to function as:

document retrieval means that retrieves a document fulfilling a given retrieval condition from a database for documents divided into items, and, for each condition item of the retrieval condition, specifies an item fulfilling the condition item in the retrieved document;

related item selection means that selects a set of related items for each item fulfilling the condition item of the retrieval condition which are specified by the document retrieval means, based on a mutual relation among items which is stored in an item information database storing a mutual relation among items into which a document is divided and a rating for each of the items which is calculated based on a predetermined criterion;

fulfilling-item set specifying means that performs a logical operation of the retrieval condition between sets of related items selected by the related item selection means to specify a set of items fulfilling the retrieval condition; and score calculation means that calculates a document rating of the document fulfilling the retrieval condition based on the ratings of items stored in the item information database and included in the set of fulfilling items specified by the fulfilling-item set specifying means.

Advantage of the Invention

The document rating calculation system according to the invention puts a document containing required information at a high rank by calculating the rating of a document based on an abundance of substantial contents for a retrieval condition, thereby allowing a searcher to easily access a target document.

BRIEF DESCRIPTION OF DRAWINGS

FIG. 4 is a diagram exemplarily showing an example of document information.

FIG. 5 is a diagram exemplarily showing an example of a document.

FIG. 6 is a diagram exemplarily showing an example of a document for presentation.

FIG. 9 is a conceptual diagram showing an example of item-by-item document information.

FIG. 12 is a conceptual diagram showing an example of subordinate item information.

FIG. 14 is a conceptual diagram showing an example of subordinate item information after correction.

FIG. 15 is a conceptual diagram showing an example of content information for calculating the rating of an item.

FIG. 16 is a conceptual diagram showing an example of weights for content information.

FIG. 17 is a conceptual diagram showing an example of item information.

FIG. 18 is a conceptual diagram showing an example of retrieval results for individual key words.

FIG. 19 is a conceptual diagram showing an example of retrieval results for a retrieval condition.

FIG. 21 is a conceptual diagram showing an example of a set of fulfilling items for a retrieval condition using AND.

FIG. 22 is a conceptual diagram showing an example of information on a set of fulfilling items.

FIG. 23 is a conceptual diagram showing an example of a set of fulfilling items for a retrieval condition using OR.

FIG. 24 is a conceptual diagram showing an example of a set of fulfilling items for a retrieval condition using AND and OR.

FIG. 28 is a diagram showing an example of the display of the results of document retrieval.

FIG. 34 is a conceptual diagram showing an example of reference history information.

FIG. 35 is a conceptual diagram showing an example of a process of calculating a reference score based on the reference number.

FIG. 36 is a conceptual diagram showing an example of a process of calculating a reference score based on the reference number and similarity to a retrieval condition.

Figure 1:
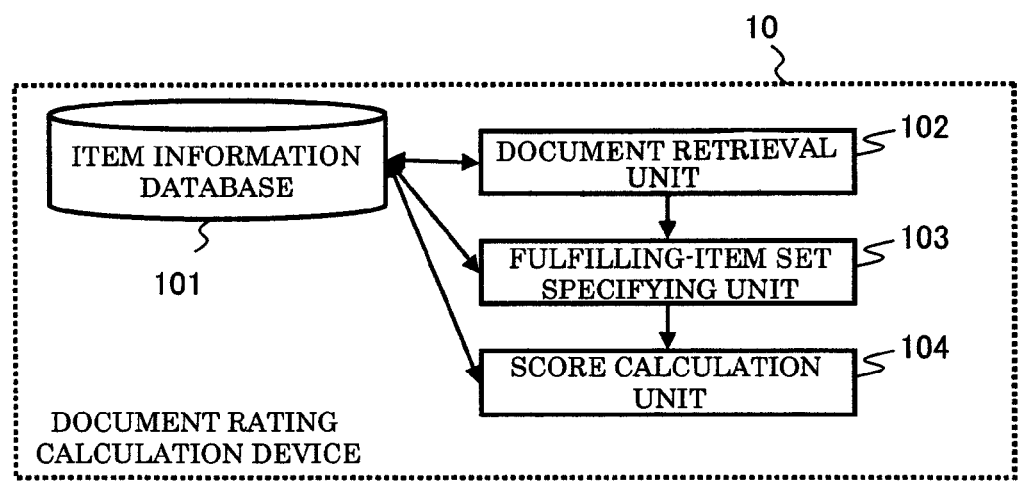
FIG. 1 is a block diagram showing an example of the configuration of a document rating calculation device according to the present invention.

DESCRIPTION OF REFERENCE NUMERALS 10 document rating calculation device
101 item information database
102 document retrieval unit
103 fulfilling-item set specifying unit
104 score calculation unit
105 reference history database
106 reference score calculation unit
107 score integration unit
20 document retrieval system
201 document database
202 item extraction unit
203 subordinate-item extraction unit
204 necessary-item determining unit
205 item rating calculation unit
301 input unit
302 output unit

BEST MODE FOR CARRYING OUT THE INVENTION

The feature of the present invention lies in specifying items relating to a retrieval condition. An item is a divided partial document from one segment to a next one which is acquired at the time of segmenting a document according to a criterion, for example, a document segmented in the unit of chapter, section or the like. Suppose that a searcher who wants to survey the trend in the market of the Web services, for example, has made a search under a retrieval condition "Web service AND market trend". The retrieval condition demands a document containing character strings equivalent to "Web service" and "market trend".

When Section 1 of a document has the head "Web services", and Section 1.1 has the head "Market Trend", for example, it can be concluded that Section 1.1 has a topic on the "market trend on Web services". Further, from the general property of a document, it can also be concluded that Section 1.1 has a topic on the "market trend on Web services" even when Section 1.1 does not contain the character string "Web service". This is because there is an implicit dependency between items such that the topic of Section 1.1 is related to the topic of Section 1. In consideration of a character string contained in an item and the dependency between items in this way, a set of items fulfilling a retrieval condition (called "fulfilling item set") in a document. According to the invention, a fulfilling item for a retrieval condition set is specified based on such a relation between items.

Embodiments of the present invention will be described in detail below referring to the accompanying drawings. It is to be noted that same reference numerals are given to same or equivalent portions to avoid repeating their descriptions.

(First Embodiment)

FIG. 1 is a block diagram showing the configuration of a document rating calculation device 10. As shown in FIG. 1, the document rating calculation device 10 includes an item information database 101, a document retrieval unit 102, a fulfilling-item set specifying unit 103, and a score calculation unit 104. The document rating calculation device 10 is achieved by a computer which operates according to a program (e.g., an information processing apparatus like a personal computer).

According to the embodiment, the document rating calculation device 10 is adapted to, for example, usage for intraoffice document retrieval service or the like in a company. The document rating calculation device 10 is also adapted to usage for a search engine service or the like in the Internet or intranet.

Figure 2:
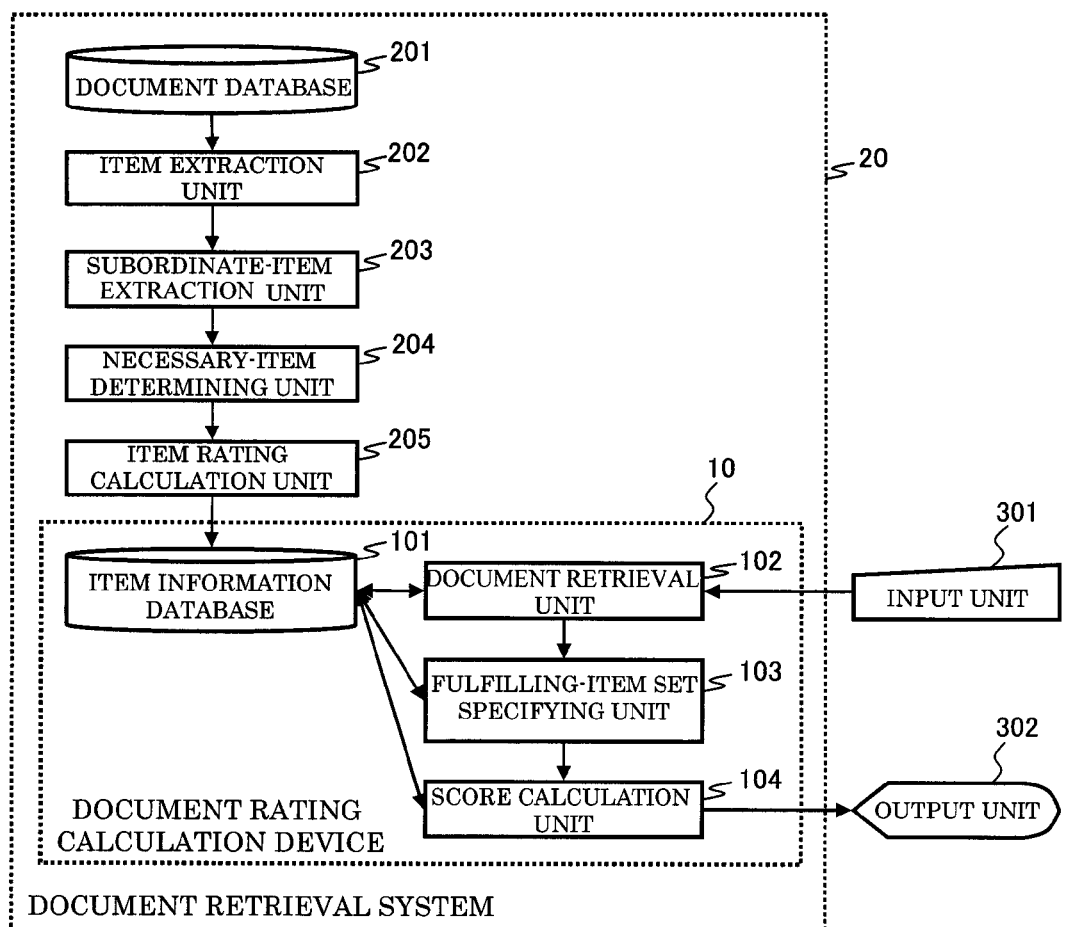
FIG. 2 is a block diagram showing an example of the configuration of a document retrieval system according to a first embodiment of the invention.

FIG. 2 is a block diagram showing an example of the configuration of a document retrieval system 20 which uses the document rating calculation device 10 according to the invention. As shown in FIG. 2, the document retrieval system 20 includes the document rating calculation device 10, a document database 201, a item extraction unit 202, a subordinate-item extraction unit 203, a necessary-item determining unit 204, and an item rating calculation unit 205. The document retrieval system 20 is also connected with an input unit 301 and an output unit 302. According to the embodiment, the document retrieval system 20 is achieved by a computer which operates according to a program (e.g., an information processing apparatus like a personal computer).

Figure 3:
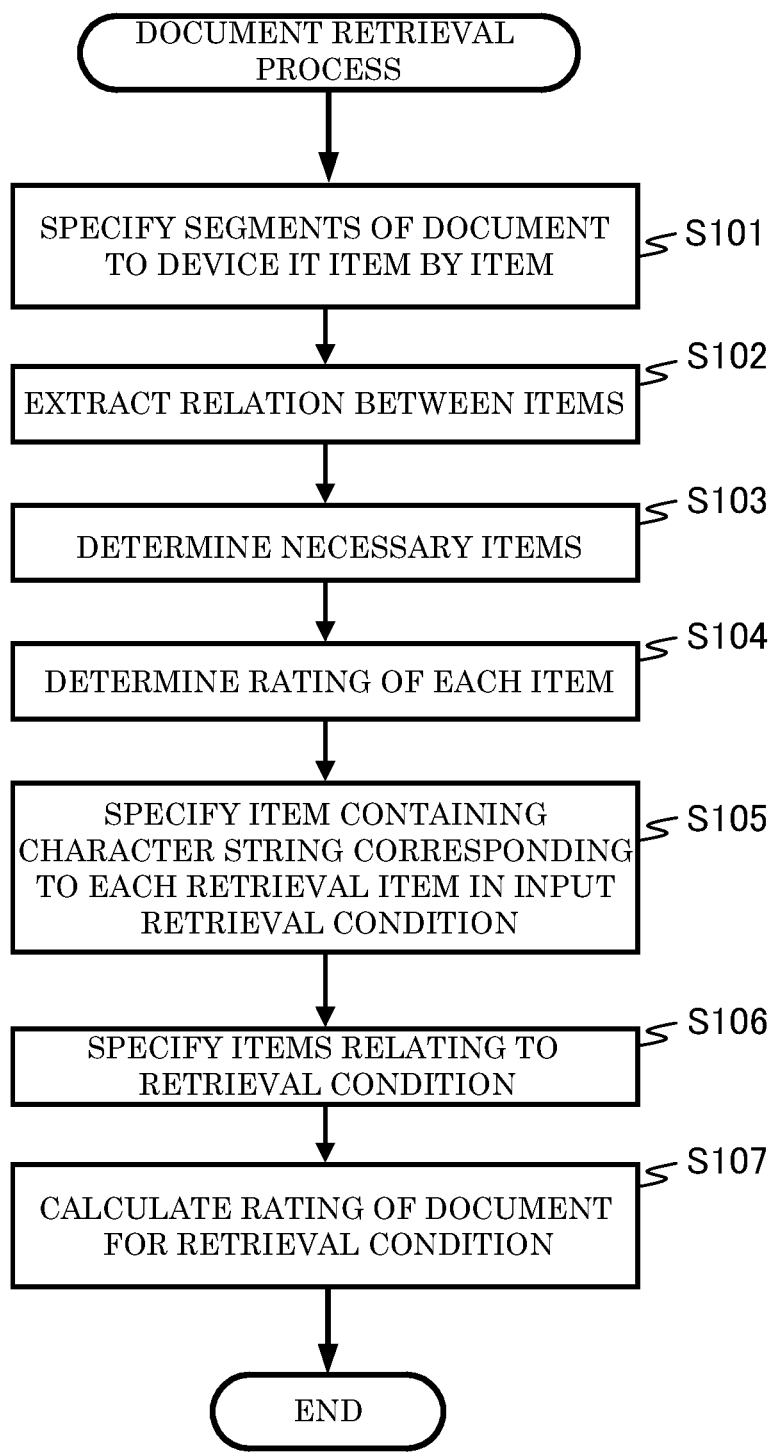
FIG. 3 is a flowchart illustrating an example of the operation of the document retrieval system.

FIG. 3 is the flowchart of a document retrieval which the document retrieval system 20 performs using the document rating calculation device 10. Referring to FIGS. 2 and 3, the functions, operations and processes the individual components of the document retrieval system 20 will be described in association with individual steps shown in the flowchart.

According to the embodiment, chapters and sections in a document are treated as items, and the rating of a document is calculated by using the dependency between individual items. The dependency between items is the relation between an item and a set of items included in a lower class having the former item at the top. The set of items is called subordinate items of the top item. It is to be noted however that the dependency between items in the invention is not limited to a partial tree structure in a hierarchical structure.

The document database 201 records documents to be searched and document information. An example of document information is shown in FIG. 4. Document information includes a document ID, a document name, a document saved location, and so forth. The document ID is an identifier for specifying each document. Each document may be registered by a document creator or may be automatically collected by a crawler or the like. Documents to be stored can be of any format as long as the documents can be processed by a computer. Documents to be stored may be documents which are created by a document creating program (word processor, for example, MS Word (Registered Trademark)), or presentation documents which are created by presentation software (e.g., MSPowerpoint (Registered Trademark)). In addition, documents to be stored may be structured documents like HTML documents.

The item extraction unit 202 obtains a document from the document database 201, and divides the document into units of non-overlapping items using information, such as the table of contents in each document. The item extraction unit 202 then extracts information such as a chapter and a figure included in each item, and outputs the results in the form of a collection of structural elements to the subordinate-item extraction unit 203. This process is equivalent to step S101 in FIG. 3.

FIG. 5 shows an example of a document having the table of contents. It is assumed that pages in FIG. 5 are arranged in order from the left-hand side. The "TITLE" in the document in FIG. 5 is the title of a document, "**" represents the head of each chapter, and " . . . " represents a body. Further, "FIGURE" and "TABLE" in the document in FIG. 5 exemplarily show that a figure and a table are located there. FIG. 6 shows one example of a document for presentation. FIG. 6 is a diagram exemplarily showing a presentation document which consists of eight slides. "No." written on the left-hand side to each slide is the page number of the slide. A character string, "FIGURE", "TABLE", etc. in each slide mean the same as those shown in FIG. 5.

First, the item extraction unit 202 extracts information on chapters and sections contained in a document from the page equivalent to the table of contents. For example, the item extraction unit 202 extracts a page having "TABLE OF CONTENTS" and "OUTLINE" written thereon using an existing text processing technique to specify texts itemized therein. Itemized information in the table of contents is a segmentation of one topic in a document, so that the item extraction unit 202 specifies a portion which fulfills text information in the table of contents from the body, and divides the body in a non-overlapping manner.

A collection of sentences or a collection of figures is one item.

Figure 7:
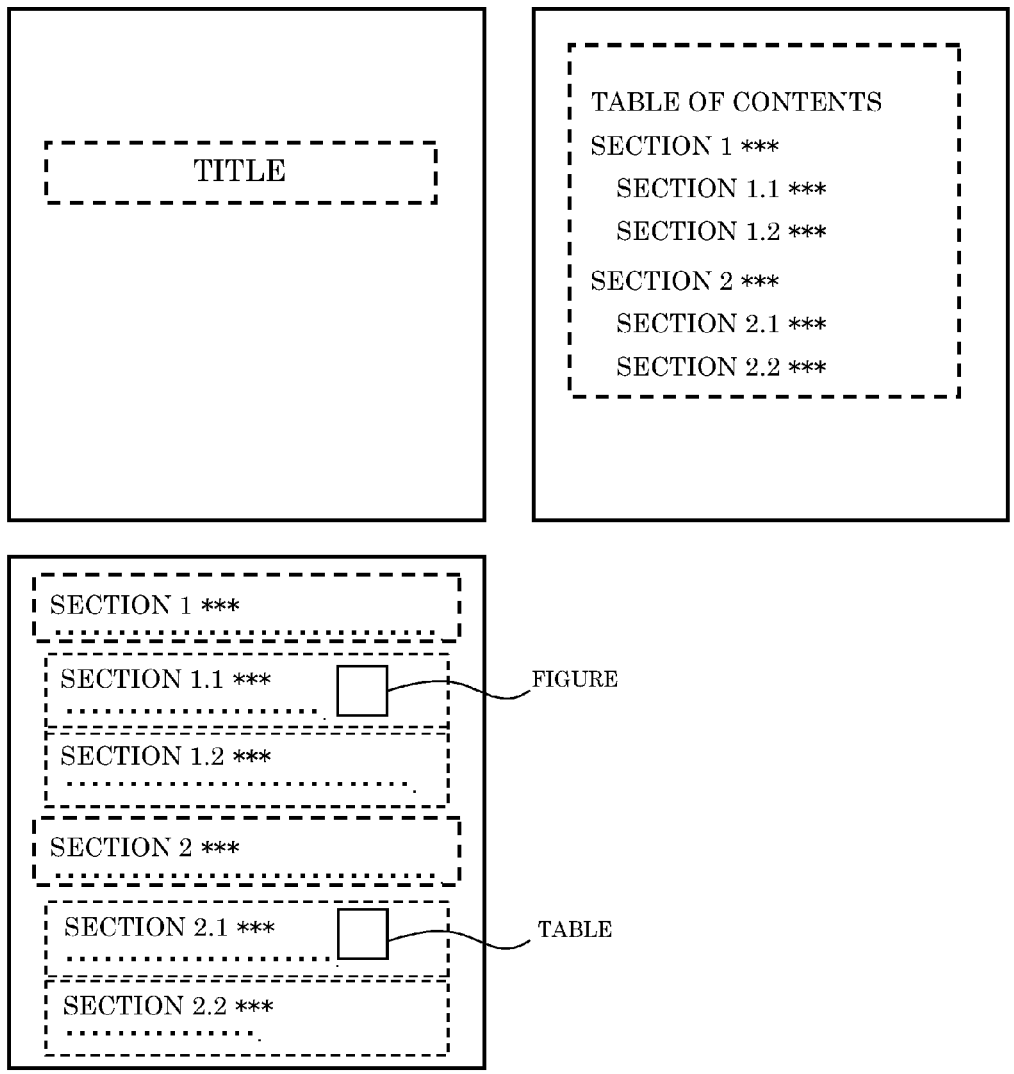
FIG. 7 is a conceptual diagram showing an example of items to be extracted.

FIG. 7 shows the results of segmenting a document in FIG. 5 item by item. A character string, or a table/figure, which is encircled by a broken line, represents one item. As shown in FIG. 7, the item of Section 1 is set to be the segment before Section 1.1 starts to inhibit overlapping between items. It is to be noted that items are extracted from a presentation document as shown in FIG. 6 done as from a normal document using information on the table of contents or the like. Because a single content in a presentation document is generally often explained with a single slide or a plurality of slides, an item is comprised of a single slide or a group of slides.

Even when a document having no table-of-contents page has numbers, such as "Section 1" and "Section 1.1", affixed to a portion equivalent to heads, as in the documents in FIGS. 5 and 6, the numbers in the heads are extracted by the existing text processing technique, and a sentence from one head to a next one is extracted as a single item. Depending on the document saving format, data may be recorded as structured information like an XML document. In this case, for example, tags which are used in the title and heads, such as title, chapter, section and subsection, from an XML document, and a sentence between tags is extracted as a single item. Extraction of an item may be carried out directly by a person.

Next, the item extraction unit 202 extracts content information contained in each item. Content information is quantized contents contained in a document, such as "number of figures", "number of tables", "number of chapters", "number of emphasis expression", "number of citations (the number of URLs or the like)", "important key word", "area of script", and "area of figure/table". An emphasis expression is a character string which is emphasized by a decoration, such as a change in font size, a change in color information, bold or italics. An important key word is a character string which is likely to appear only in the document, a character string registered beforehand, or the like. The area of a script is the ratio of a script occupying in each item, and the area of a figure/table is the ratio of the area of a figure/table occupying in each item. The types of content information are not limited to the above examples. For example, the "number of graphs", the "number of equations", etc. may be set as content information.

Figure 8:
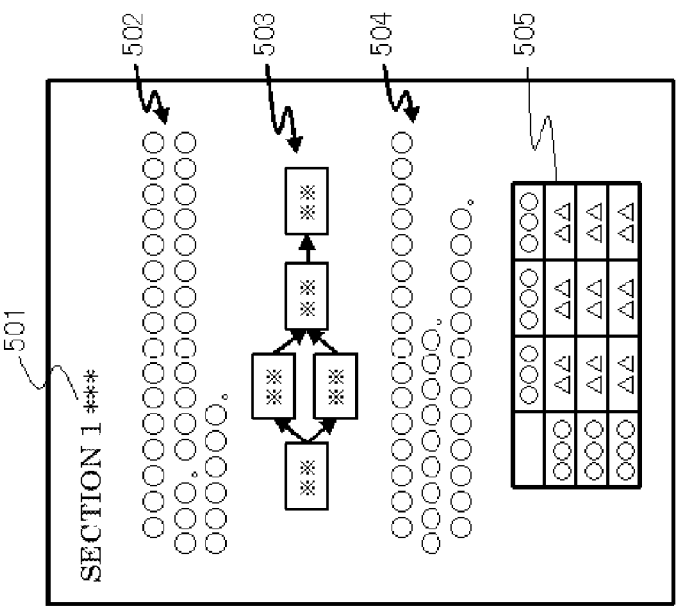
FIG. 8 is a conceptual diagram showing an example of the result of extracting content information.

FIG. 8 shows an example of the result of extracting content information. FIG. 8 shows one item in a document, and content information for the item. The item in FIG. 8 has "Section 1*" 501 as a head. A script 502 explaining a figure, a FIG. 503, a script 504 explaining a table 505, and the table 505 are described in the item in FIG. 8. Since the item in FIG. 8 includes one FIG. 503 and one table 505, the number of figures and the number of tables in the content information are both 1. With the character string 501 of the head being Chapter 1, the number of sentences in the item is 5 in total. Further, since the character string 501** of the head has a larger font size than other character strings, it is considered as an emphasis expression. Accordingly, the number of emphasis expressions in the item is 1. In addition, the ratios of the sentences, the figure and the table occupying in the area of the item are about 30 percent, so that the area of the script and the area of the figure are both 0.3. Since the item does not contain information corresponding to a citation or an important key word, the number of citations and the number of important key words are 0.

When a stored document is of the XML type, it is easy to specify content information. For example, there is a method of previously registering tags having individual pieces of content information described thereon, and extracting information on a target tag. There also is a method of recording an output image of each page of a document as image data, and extracting color information and rectangular size of an area identifiable as characters using an existing image processing technique, OCR technique or the like. Using such a method, the presence/absence of an emphasis expression, the area of a script region, etc. are specified.

The item extraction unit 202 arranges individual items obtained according to the foregoing process, and content information contained in the individual items into item-by-item document information. The item extraction unit 202 then outputs the data to the subordinate-item extraction unit 203. FIG. 9 shows an example of the item-by-item document information.

An item ID for identifying each item, an ID of a document containing the item, text information contained in the item, content information in each item, etc. are recorded in the item-by-item document information. The text information is used to specify which key word is included in which item at the time of retrieval. An index may be generated for a text in each item beforehand. The generation of an index, which takes time, speeds up retrieval.

The subordinate-item extraction unit 203 obtains item-by-item document information from the item extraction unit 202, and outputs subordinate item information, which is the result of specifying the dependency between items, and the item-by-item document information to the necessary-item determining unit 204. According to the embodiment, the dependency between items is explained as the hierarchical structure of the table of contents. The subordinate item extraction is equivalent to step S102 in FIG. 3.

Figure 10:
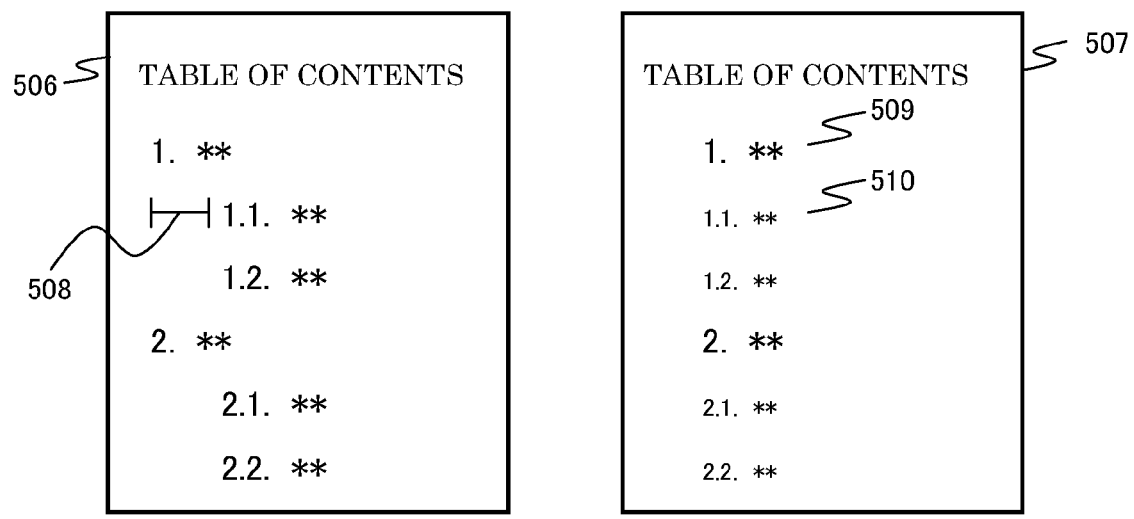
FIG. 10 is a diagram exemplarily showing examples of a page on the table of contents.

The table of contents is one of information sources for extracting the hierarchical structure among items. FIG. 10 shows two typical examples of the table of contents. In a left example 506 in FIG. 10, there is an indented space 508 between one section and the following section. This space permits extraction of a hierarchical structure. Generally, the greater the indented space, the deeper the hierarchy. In a right example 507 in FIG. 10, there is a difference in font size between heads (509, 510). This difference permits extraction of a hierarchical structure. That is, a hierarchical structure which exists between items is extracted by the difference or similarity between changed characteristics. There also is a method of extracting a hierarchical structure among items by obtaining a chapter number or a section number from the numeral affixed to the top of a character string equivalent to the head of each item.

Figure 11:
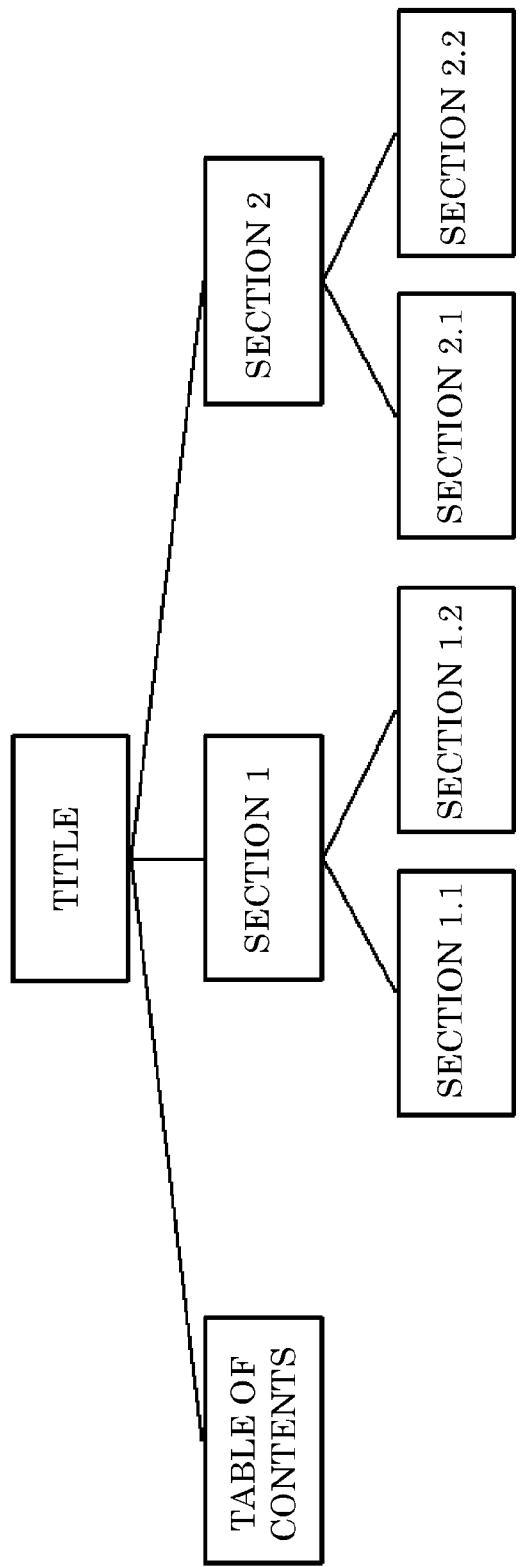
FIG. 11 is a diagram showing an example of a relation among items.

FIG. 11 shows an example of a hierarchical structure among items which is obtained from the documents in FIG. 5 and FIG. 6 through the foregoing process. While the documents shown in FIGS. 5 and 6 differ in form, they have the same chapter structure, so that the hierarchical structures obtained from the documents shown in FIGS. 5 and 6 becomes the same. In case where the dependency between items is extracted, the item of the title is arranged as a root node in the hierarchical structure, and the items of the sections are arranged as child nodes as shown in FIG. 11. The page on the table of contents is placed under the root node.

The subordinate-item extraction unit 203 arranges the subordinate items of each item as subordinate item information. FIG. 12 shows an example of subordinate item information. The subordinate item information includes the IDs of the individual items, document IDs, and subordinate items. In FIG. 12, head information is described to make it easier to see what item each item ID indicates. The head information is described for the purpose of explanation, and need not be included in the subordinate item information. The item IDs and the document IDs correspond to those in the item-by-item document information shown in FIG. 9. The subordinate item is an item included in the class that has a target item placed at the top in the hierarchical structure among items. In the example in FIG. 11, for example, the subordinate items of the item of Section 1 are "Section 1", "Section 1.1" and "Section 1.2", and the subordinate items of the title become all the items. Information described in the item of Section 1 is relevant to the contents of Section 1.1 and Section 1.2. That is, the if a subordinate item is specified, it is easy to specify to which item a character string is related.

The documents in FIGS. 5 and 6 contain eight items, "title", "table of contents", "Section 1", "Section 1.1", "Section 1.2", "Section 2", "Section 2.1", and "Section 2.2". One example of a method of storing subordinate items is to express whether each item is subordinate to a certain item in the form of a bit sequence of 0/1. The subordinate-item extraction unit 203 arranges 0/1 for individual items in the order thereof with, for one item, 1 set to that item itself and an item subordinate thereto and 0 set to an item which is not subordinate thereto, and stores the sequence as a subordinate item. According to this rule, a subordinate item for the item of Section 1 becomes "00111000", and a subordinate item for the title becomes "11111111". Those items which are given 1 in the subordinate item extraction process are candidates to be used at the time of calculating the document rating. Any other methods than the bit sequence storing method can be adopted to store subordinate items as long as it is possible to determine to which item each item is related. In addition, the process of the item extraction unit 202 can be executed at the same time as the process of the subordinate-item extraction unit 203. In this case, the bath processing can be carried out to efficiently increase the calculation speed.

The description of the embodiment has been given of the case where the dependency between items is extracted from the table of contents and heads. However, it is also possible to extract information expressly describing the dependency between items to associate the items with one another, such as " . . . in the preceding section" or "described in detail in Section 2.3" in the texts in a document. When there is an appendix at the end of a book, a description like "see the appendix" may be given in the body. The dependency between items can also be extracted from such a description. Further, one of individual items should not necessarily be a parent, and items which refer to each other can be subordinate to each other. Therefore, the dependency between items is not limited to a hierarchical structure, and there may be a network-like structure in which items are subordinate to one another.

Figure 13:
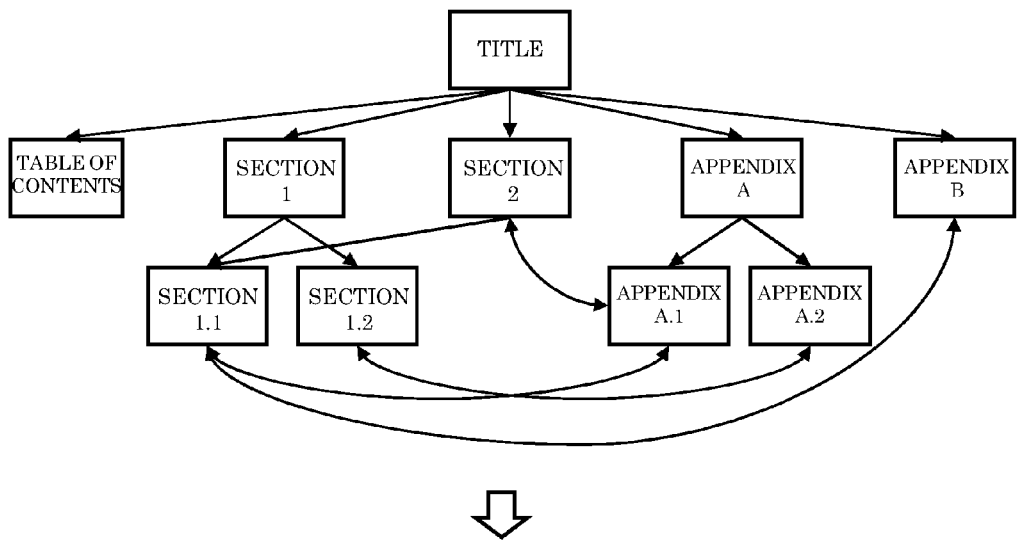
FIG. 13 is a conceptual diagram showing an example of subordinate item information of a document having a network-like dependency.

FIG. 13 shows an example where the dependency between items is in a network-like structure. The network structure in the upper part of FIG. 13 represents the dependency between items of a document. Each node in the network structure means a single item, and the connection between nodes represents the dependency. In the connections in FIG. 13, arrowhead side items are subordinate items. A connection with arrowheads on both side represents that both items are subordinate to each other.

In the example of FIG. 13, Section 1.1 refers to Appendix A.1 and Appendix B, Section 1.2 refers to Appendix A.2, and Section 2 refers to Section 1.1 and Appendix A.1. Appendix A.1 describes that the appendix is the supplement of Section 1.1 and Section 2, Appendix A.2 describes that the appendix is the supplement of Section 1.2, and Appendix B describes that the appendix is the supplement of Section 1.1. Therefore, the document in FIG. 13 has a structure where the appendixes and the body are subordinate items to each other.

The table in the lower part of FIG. 13 shows subordinate item information storing subordinate items with the network structure in the upper part of the diagram. A subordinate item is simply expressed as a bit sequence with 1 given to an item which is subordinate to an individual item and 0 given to an item which is not subordinate thereto. Therefore, even when the dependency between items does not have a hierarchical structure, but is complicated, as indicated in the subordinate item filed, subordinate items are stored in a description form similar to that of the hierarchical structure. Whether the dependency between items has a hierarchical structure or a network structure does not influence the subsequent process.

The necessary-item determining unit 204 obtains subordinate item information and item-by-item document information from the subordinate-item extraction unit 203, and corrects the subordinate item information in such a way that unnecessary items do not influence the calculation of the rating. The necessary-item determining unit 204 then outputs the result and the item-by-item document information to the item rating calculation unit 205. The process of the necessary-item determining unit 204 is equivalent to step S103 in FIG. 3.

While the table of contents is useful information in seeing the general view of a document, the item is not necessary in considering the calculation of the rating of a document. Other examples of such an item are the introduction of the background and the acknowledgement. The necessary-item determining unit 204 changes those bits in the bit sequence of 0/1, stored as subordinate items in the subordinate item information, which do not influence of the rating of the document to 0. The items which are subjected to this process will be excluded from candidates in the calculation of the document rating. Specifically, a bit sequence for correction which has 0 set for bits corresponding to items that are determined as unnecessary in the calculation of the document rating, and 1 set for the other bits is generated, and a logical product of this bit sequence and the bit sequence subordinate items is performed bit by bit. The subordinate items have only to be overwritten with the operation result.

FIG. 14 shows subordinate item information after correction which is obtained when the table of contents in the subordinate item information in FIG. 12 is made unnecessary in the calculation of a document rating. As the second item, P002, in the example in FIG. 14 is the head "table of contents", the correction bit sequence becomes "10111111". The result of calculating the logical product of the correction bit sequence and the bit sequence of the subordinate items in FIG. 12 bit by bit is the subordinate items shown in FIG. 14. Through this process, the second bits in the subordinate items in the items of a "title" 511 and "table of contents" 512 are changed to 0 from 1. The item that has the head "table of contents" is excluded from candidates in the calculation of the document rating through the necessary item determining process.

The determination on whether or not an item is necessary has only to be made using a character string or the like of the head in text information in the item-by-item document information. When the head coincides with a previous registered character string, such as "table of contents" or "acknowledgement", for example, the bit in the correction bit sequence which corresponds to the item has only to be set to 0.

The item rating calculation unit 205 obtains the subordinate item information and item-by-item document information from the necessary-item determining unit 204, and calculates the ratings of individual items. The item rating calculation unit 205 then arranges the results into item information, and records the item information in the item information database 101. The process of the item rating calculation unit 205 is equivalent to step S104 in FIG. 3.

The item rating calculation unit 205 calculates the rating of each item based on the content information contained in that item. FIG. 15 shows an example of indexes for calculating the ratings of items. In FIG. 15, the values of content information extracted by the item extraction unit 202 have only to be used directly for c1 to c6. The balance between a document and figure/table, c7, is calculated based on the area of a document in the content information and the area of the figure/table. An equation 1, for example, can be used as a method of calculating the balance.

$$\text{balance between document and figure/table} = p \times \log(p) + (1-p) \times \log(1-p) \quad (1)$$

where p=S (sentence)/(S (document)+S (figure/table)), and S (document) and S (figure/table) are the area of the document stored in the content information and the area of the figure/table stored therein. log represents a logarithm to base 2. The indexes for ratings in FIG. 15 are one example, and other indexes, such as the number of graphs and the number of equations, are available.

Next, the item rating calculation unit 205 calculates the ratings of individual items using those indexes. The indexes contain those which should be particularly accounted for, and those which are not. Accordingly, each index is given a weight based on the degree of account, and the weighted sum of the weight and the value of each index, or the like is set as the rating of each item. An equation 2 shows an example of an equation of calculating the rating of an item.

$$\text{rating of item} = \Sigma c_i \times w_i \quad (2)$$

i in the equation 2 is a subscript, so that $c_i$ corresponds to c1 to c7 in FIG. 15, and $w_i$ corresponds to w1 to w7 in FIG. 16. FIG. 16 shows an example of weights for individual items indexes. In the example of FIG. 16, weights for the number of figures and tables, and the balance between a document and figure/table are taken into account. Weights for individual indexes have only to be set by the manager of the document retrieval system 20. The weights may be adjusted according to information needed by a searcher himself/herself. When a document containing a lost of figures is needed, a searcher can easily obtain a desired document by increasing the weight for the number of figures. For example, the rating of the items shown in FIG. 8 which is calculated based on the weights shown in FIG. 16. is 4.0.

It is to be noted that weights for indexes may be changed according to the type of a document. For example, the weight for the number of figures can be increased for a presentation document, and the weight for the number of sentences can be increased for a material for explanation. Accordingly, This can allow information to be taken into account can be changed for the type of each document. In this case, it is necessary to register the types of documents beforehand. A calculation method other than the equation 2 may be used in calculating the rating.

For example, the ratings of items may be calculated according to the if-then rule where an index is in an if clause. Examples of the rule are given below.

if (the number of graphs>0 AND the number of
tables>0) Then rating of item+=5

According to the exemplified rule, when there is an item containing one or more graphs and tables, five points are added to the rating of the item. Of course, there may be a plurality of rules, or there may be a rule which sets a negative value to the rating of an item. Further, different sets of rules may be used for differs types of documents respectively too obtain the ratings of items. The use of the rule-based calculation brings about advantages, such as making it easier to combine a plurality of indexes and making the criteria for acquiring the ratings of items clearer.

Finally, the item rating calculation unit 205 generates item information which has a collection of the calculated ratings of individual items, the subordinate item information and the item-by-item document information, and outputs the result to the item information database 101, FIG. 17 shows an example of item information. The item information includes item IDs, document IDs, text information, subordinate items, and ratings of items. When the text information has already been indexed, the whole texts need not necessarily be recorded, so that only character strings equivalent to the heads of the individual items may be saved. The item information is created for all the documents registered in the document database 201. Accordingly, records for the number of items of each document x the number of documents are stored.

The item information database 101 records hierarchical structure information. It is to be noted that the hierarchical structure information may be manually recorded, corrected and deleted directly.

The input unit 301 outputs a retrieval condition input by a searcher to the document retrieval unit 102. The input unit 301 can be any means which can input a retrieval condition in a machine readable manner. A keyboard or the like may be used, or audio inputs may be adopted. According to the embodiment, a retrieval condition is a single key word, or one or more key words designating a logical operation method. When a retrieval condition "security AND market trend" is given, for example, key words are "security" and "market trend", and "AND" designated a logical operation on the key words. AND represents that individual key words are combined by "AND". Therefore, the retrieval condition request a document containing "security" and "market trend". Besides AND, logical operations on the key words includes "OR" that designates inclusion of any of the key words, and "NOT" that demands a document which does not contain the key words. In addition, those logical operations may be combined. Any method of describing a retrieval condition is acceptable as long as it can allow a computer to specifically specify key words and a logical operation thereon.

The document retrieval unit 102 refers to the item information database 101 to specify a document which fulfills the retrieval condition obtained from the input unit 301. Further, the document retrieval unit 102 specifies in which items character strings equivalent to individual key words are contained, and outputs the results together to the fulfilling-item set specifying unit 103. The process of the document retrieval unit 102 is equivalent to step S105 in FIG. 3.

First, the document retrieval unit 102 specifies in which item in the document each key word given as the retrieval condition is contained. When the retrieval condition is input, the document retrieval unit 102 extracts key words from the retrieval condition one by one. When the retrieval condition is "security AND market trend", "security" and "market trend" are extracted.

Next, the document retrieval unit 102 retrieves items containing the individual key words, and stores the hit item IDs and document IDs for each key word. An existing technique can be used for the retrieval method. The document retrieval unit 102 may perform retrieval by comparing character strings of a key word and text information in item information, or may perform retrieval after generating indexes item by item beforehand. The document retrieval unit 102 performs those processes for each extracted key word to specify items containing the individual key words, and stores the hit item IDs and document IDs.

The character string of the retrieval condition and a character string in an item should not necessarily coincide with each other exactly. The document retrieval unit 102 may have a function which copes with an orthographic variation like "movement" and "moviment". In addition, the document retrieval unit 102 may perform a process of regarding "computer" and "calculator" using a thesaurus or the like. FIG. 18 shows an example of retrieval results for individual key words.

Finally, the document retrieval unit 102 uses a logical operation between the key words of the retrieval condition with respect to the document IDs hit with the individual key words to specify documents to be displayed as the retrieval results. The document retrieval unit 102 then stores the document IDs as the retrieval results, the key words, and the IDs of the items containing the key words in association with one another.

Since the retrieval condition is "security AND market trend" in the example of FIG. 18, documents containing "security" and "market trend" are the retrieval results. In FIG. 18, the document IDs which exist on both sides of the retrieval results with the individual key words are D001, D003, and D005, which are the retrieval results.

FIG. 19 shows an example of retrieval results to be stored. As shown in FIG. 19, it follows from the structured storage method that D001 is the document which fulfills the retrieval condition. It also follows that the "security" is contained in P003 and P008 in D01, and "market trend" is contained in P004.

Words which are considered as representing individual items, such as words written in the "head" or words written emphatically (called emphasis word), may be stored separate from the "text information" of the body in the item information database 101. The document retrieval unit 102 may specify whether the key word coincides with the "head", or "emphasis word", or other text information. When the key word coincides with the head, or emphasis words, a process of temporarily multiplying the rating of that item by a constant is performed in the subsequent process. Through those processes, the ratings of the items are corrected in such a way as to increase the ratings of the documents having the retrieval items contained in the "head" or "emphasis word". When the indexes for retrieval are created beforehand, the "head", or "emphasis word", or "other text information" has only to be managed with different indexes.

The fulfilling-item set specifying unit 103 obtains the retrieval condition and the retrieval results from the document retrieval unit 102, and specifies a fulfilling item set which fulfills the retrieval condition. The fulfilling-item set specifying unit 103 then outputs the result to the score calculation unit 104. The process of the fulfilling-item set specifying unit 103 is equivalent to step S106 in FIG. 3. The fulfilling item set is determined by an item containing a character string equivalent to each key word in the retrieval condition, and subordinate items in the subordinate item information.

First, the fulfilling-item set specifying unit 103 refers to the item information database 101 to extract related information of the item ID containing each key word in each document as the retrieval result.

Suppose D001 in the retrieval results in FIG. 19 is the document in FIG. 5. The items containing "security" in the document in the example in FIG. 19 are P003 and P008. The subordinate items of those item IDs are "00111000" and "00000001" respectively, as shown in FIG. 17. Likewise, the item containing "market trend" is P004, and the subordinate item corresponding to the item ID is "00010000".

Next, the fulfilling-item set specifying unit 103 calculates a logical sum for each bit in the subordinate item obtained with each key word. Accordingly, related items of each key word are obtained.

Figure 20:
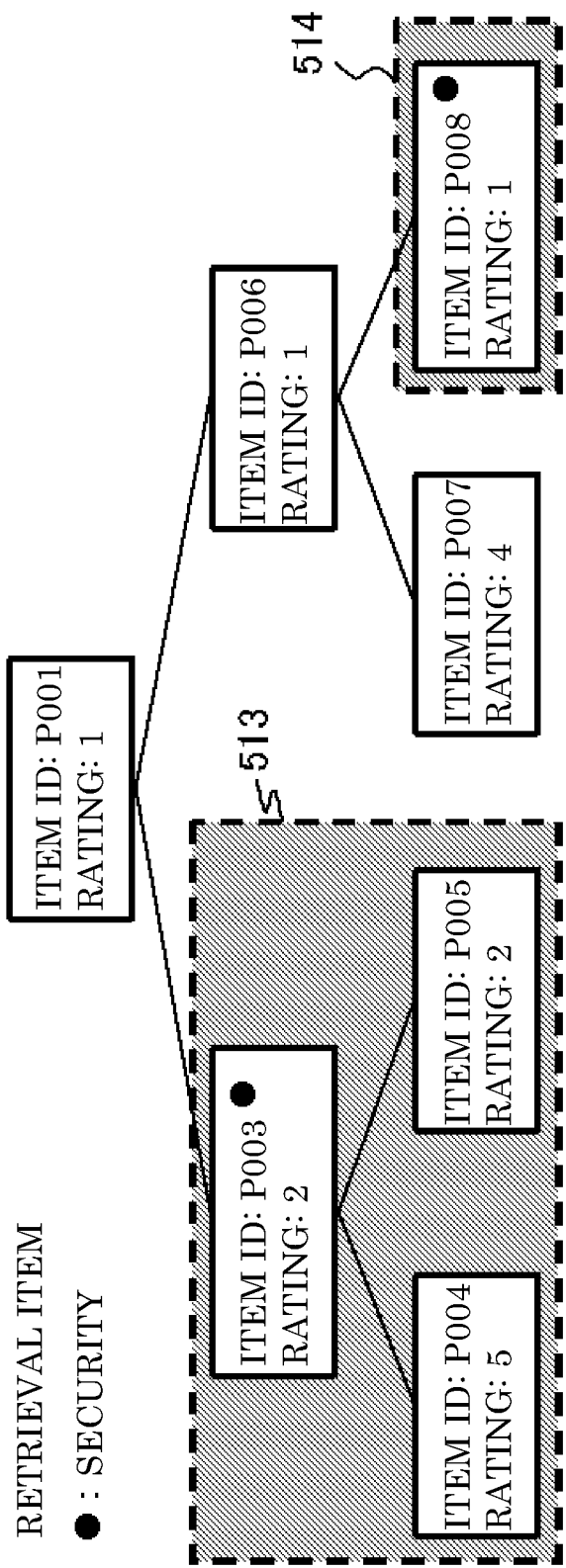
FIG. 20 is a conceptual diagram showing an example of a set of fulfilling items for a single key word.

With regard to the document (D001)ÿshown in FIG. 15, the items containing "security" are "00111000" and "00000001" as mentioned above, so that "00111000" is the related items for the key word. FIG. 20 exemplarily shows subordinate items for the key word "security" with respect to D001. FIG. 20, corresponding to FIG. 11, represents the hierarchical structure between items of D001, and shows the relation between the items containing the key word and the subordinate items. It is to be noted however that since the necessary-item determining unit 204 has excluded the item "table of contents" from the candidates for calculating the document rating, a node corresponding to "table of contents" is omitted in FIG. 20.

In FIG. 20, the black dot in a node indicating an item represents that the key word "security" is contained, and an item in the hatched rectangular area represents a related item. The subordinate items for P003 and P008 respectively correspond to the items in a rectangle 513 and the item in a rectangle 514. As shown in FIG. 20, the items relating to "security" in D001 are four items P003, P004, P005 and P008, which coincides with the calculation result of the bit-by-bit logical sum of the subordinate items. Referring to FIG. 19, there is only one item, P004, which contains "market trend", in D001. Therefore, "00010000" representing the subordinate item of the item is the related item for the key word "market trend". This is equivalent to the item with a black square in a node in FIG. 21.

Finally, the fulfilling-item set specifying unit 103 calculates a logical operation between key words input as the retrieval condition for the related items for each key word obtained in the foregoing process, thereby specifying a fulfilling item set of items relating to the retrieval condition.

Since the retrieval condition is "security AND market trend" in the example of FIG. 18, a bit-by-bit logical operation is performed on the subordinate items of the individual key words, "00111001" and "00010000". As a result of the logical operation process, "00010000" is obtained. That is, it is specified that the item in the document D001 that fulfills "security" ANDed with "market trend" is only P004 whose subordinate item is the rectangle 515 in FIG. 21.

Figure 21:
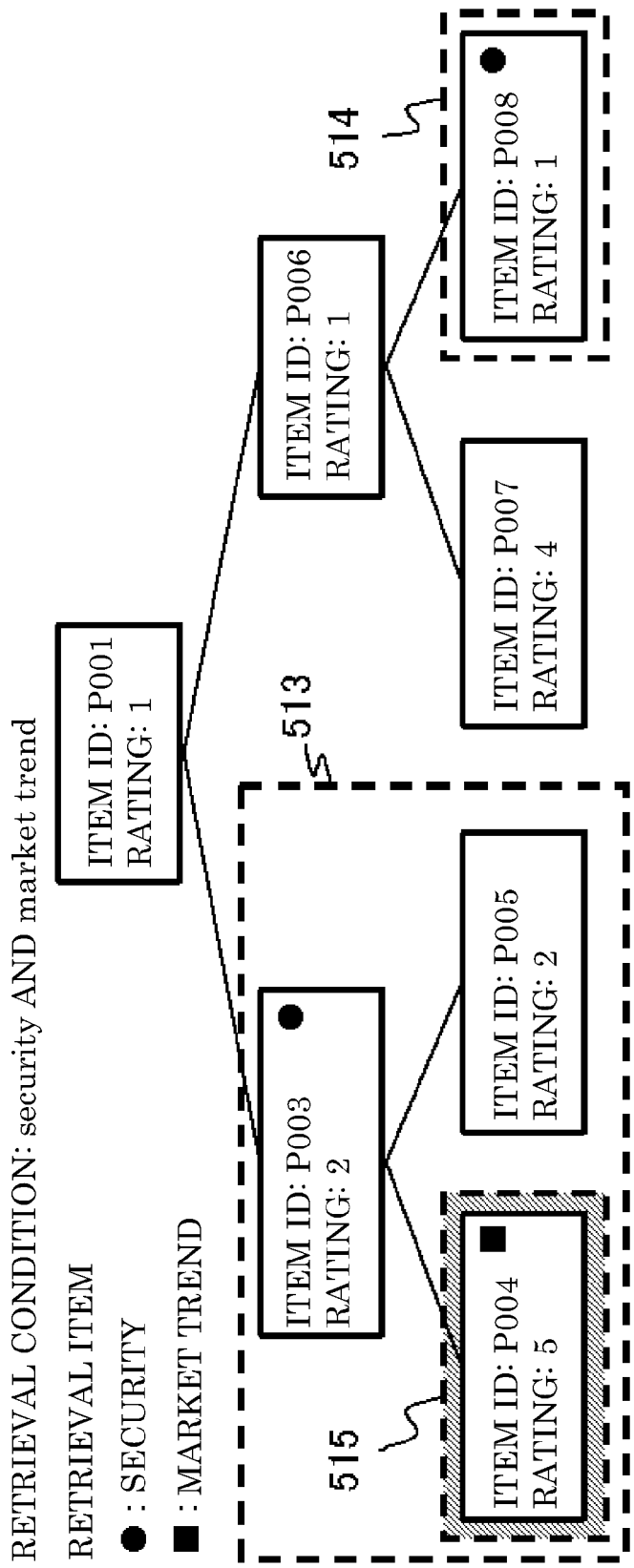

Since "security" is ANDed with "market trend", the fulfilling item set for the retrieval condition is acquired by obtaining a logical product of those subordinate items. As shown in FIG. 21, the encircled and hatched common portion of the related items to the individual key words is only the portion with item ID P004. This result coincides with the result of calculating the bit-by-bit logical operation on the related items for the aforementioned each key word. It follows that a fulfilling item set can be specified by adopting a logical operation on key words in the retrieval condition to related items for each key word.

The logical operation process is used for all documents obtained as the retrieval results. Then, the result of the logical operation of the retrieval condition with respect to a set of related items for each document ID is specified, and is stored as fulfilling-item set information. An example of the fulfilling-item set information is shown in FIG. 22. In FIG. 22, item IDs of the items which are determined as a fulfilling item set are stored for each document ID. It is understood that in D001, the item relating to the input retrieval condition is P004 by referring to the fulfilling-item set information. The execution of the logical operation may result in that there is no fulfilling item set.

Figure 23:
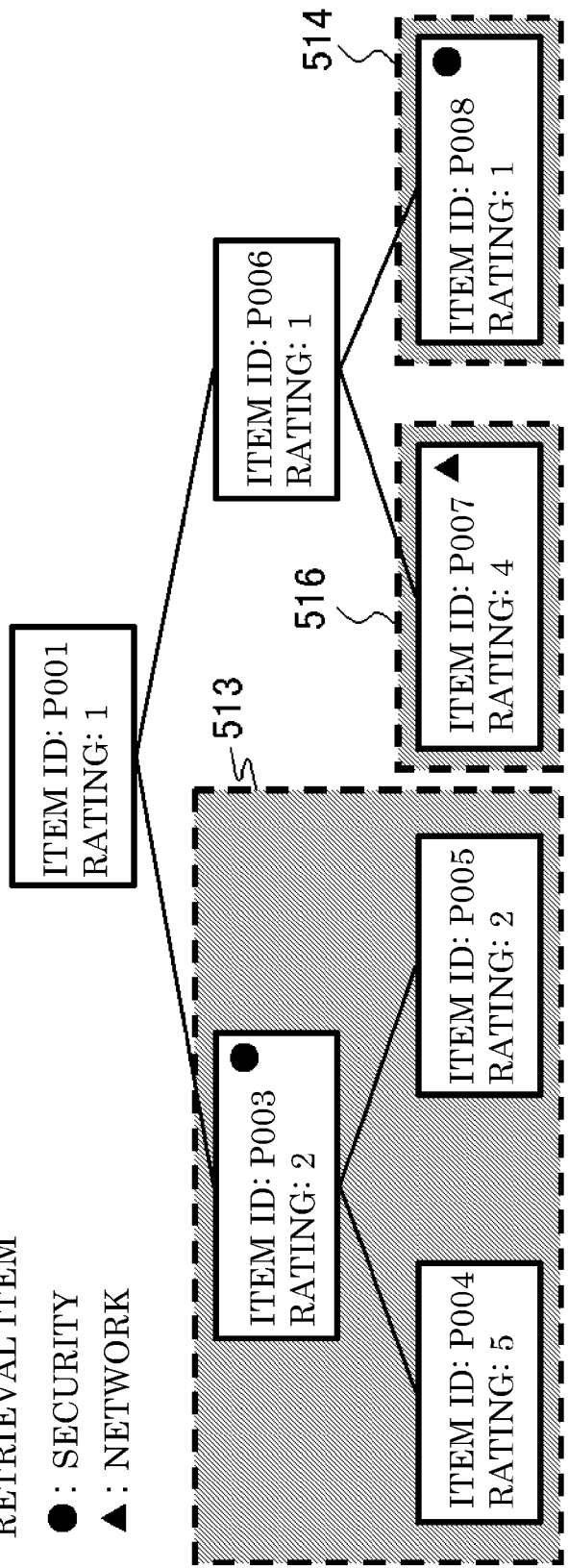

There is a case where the logical operation on the individual key words in the retrieval condition is other than AND. FIG. 23 exemplarily shows the fulfilling item set for D001 when the retrieval condition is "security OR network". FIG. 23 shows an example where P003 and P008 contain a character string equivalent to security, and P007 contains a character string equivalent to network. As in the aforementioned example, items in a partial tree with each item as a root in the hierarchical structure of a document are subordinate items. Therefore, related items to the key word "security" are those included in a rectangle 513 and a rectangle 514. Since the logical operation on the two key words is OR in the retrieval condition, a sum set of those items, P003, P004, P005, P007 and P008, are a fulfilling item set.

Figure 24:
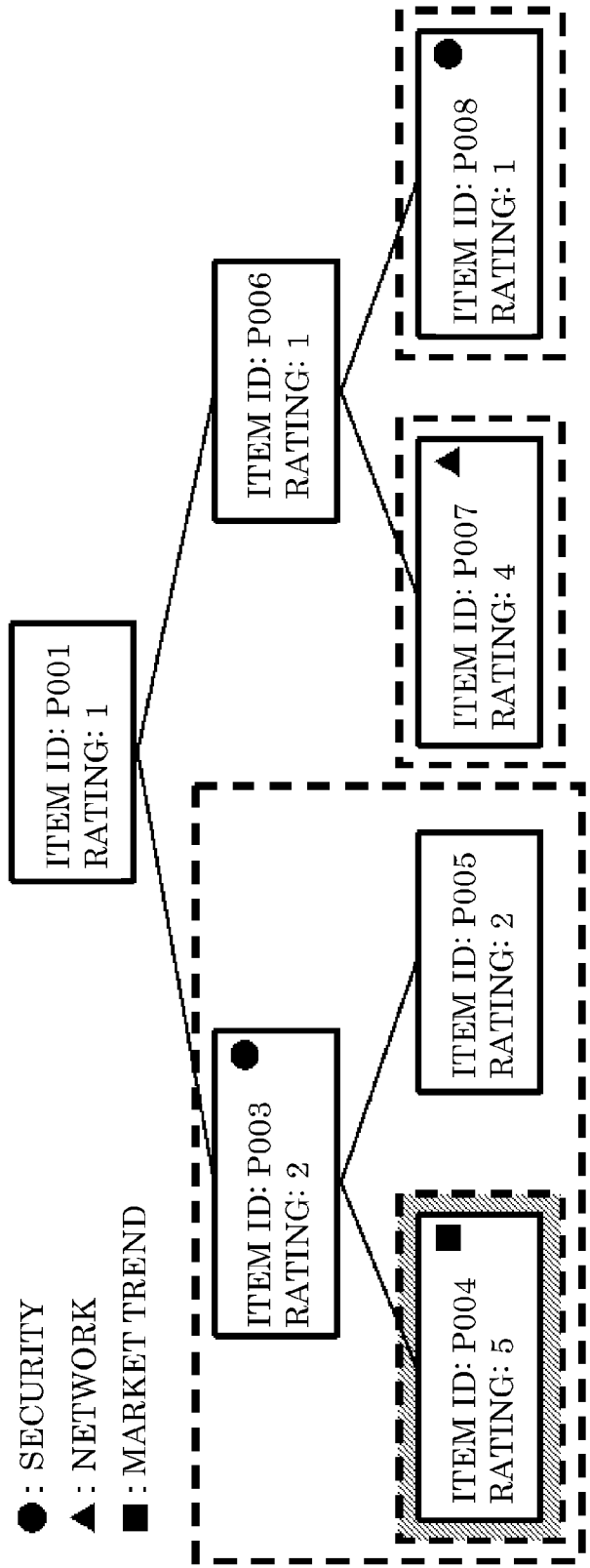

FIG. 24 shows a fulfilling item set in D001 when the retrieval condition is "(security OR network) AND market trend". "( )" in the retrieval condition represents that the operation in ( ) is to be performed first. Therefore, the combined retrieval condition represents that the fulfilling item set shown in FIG. 23 is narrowed with the key word "market trend". In the example of FIG. 24, it is only P004 which is a related item to "market trend". Accordingly, the logical operation AND is performed on this related item and the fulfilling items in FIG. 23, and P004 obtained as the result is a fulfilling item set for the combined retrieval condition.

Figure 25:
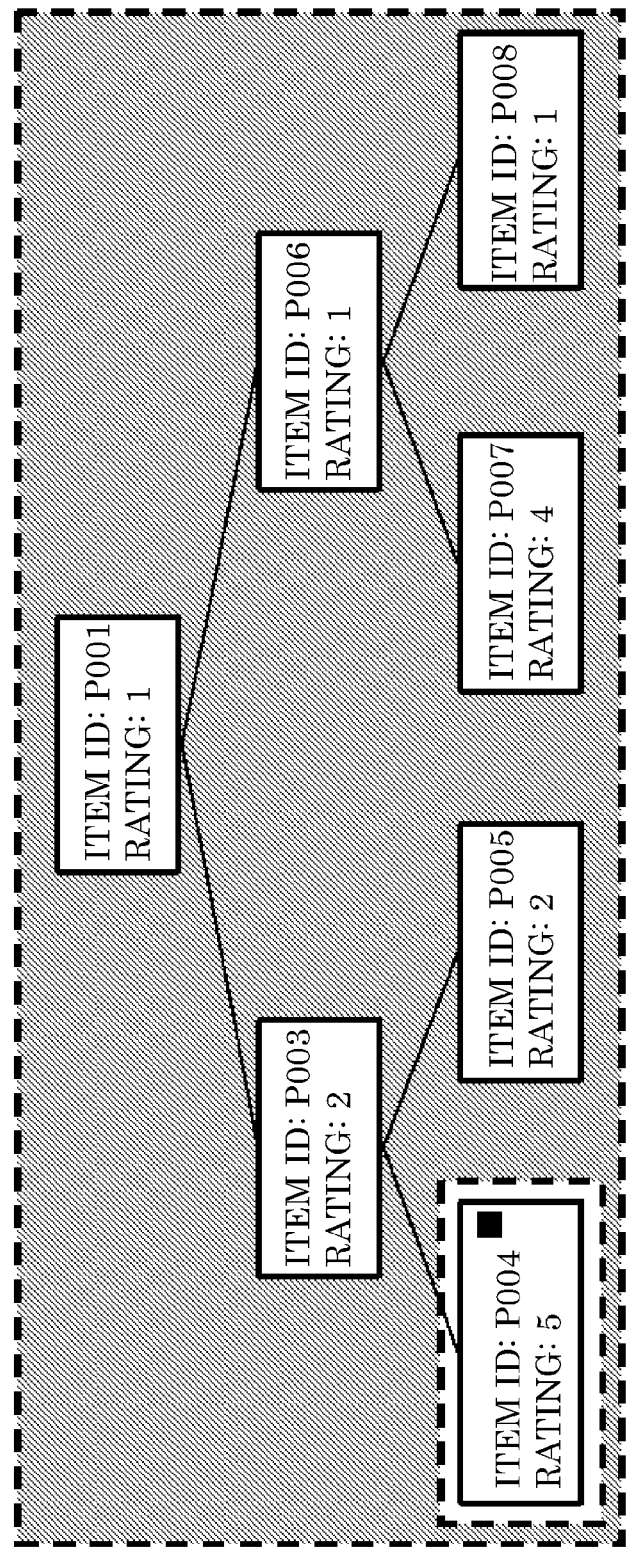
FIG. 25 is a conceptual diagram showing an example of a set of fulfilling items for a retrieval condition using NOT.

A description will be given of the process when NOT is included in the retrieval condition. There are two operation approaches for NOT. One approach is that a document containing a designated key word is not displayed as the retrieval result. In this case, when the document retrieval unit 102 performs document retrieval for each key word, a document containing the key word has only to be excluded from the retrieval results. Alternatively, the fulfilling-item set specifying unit 103 has only to exclude a document containing the key word from targets for specifying a fulfilling item set. The other approach is that as shown in FIG. 25, items which do not contain the key word become items fulfilling the retrieval condition. FIG. 25 shows a fulfilling item set for D001 when the retrieval condition is "NOT market trend". As mentioned above, the subordinate item in D001 for "market trend" is "00010000". Therefore, the related items to NOT in the key word are "11101111" which is the inversion of the individual bits 0/1 in the bit sequence. Therefore, P001, P003, and P005 to P008, which are items included in the hatched portion in FIG. 25 are a fulfilling item set for the retrieval condition "NOT market trend".

Which NOT operation to select depends on the thinking of the manager of the document retrieval system 20 or a searcher. A changeover button or the like has only to be provided on the display screen or the like to set which NOT operation the manager or searcher uses.

As apparent from the above, if related items to each key word can be specified, a fulfilling item set can be obtained by a simple logical operation in either operation approach.

The score calculation unit 104 obtains the fulfilling-item set information from the fulfilling-item set specifying unit 103. The score calculation unit 104 then scores the rating of each document based on the ratings of the individual items by referring to the obtained includes information, and outputs the result to the output unit 302. The process of the score calculation unit 104 is equivalent to step S107 in FIG. 3.

A fulfilling item set is a portion of a document which describes contents relating to the retrieval condition. Therefore, the rating of a document for the retrieval condition can be calculated by using the ratings of the items specified as the fulfilling item set. The simplest method of calculating the rating of a document is to calculate the sum of the ratings of the items included in the fulfilling item set. The score calculation unit 104 extracts the ratings of the item IDs recorded in the fulfilling item set of each retrieved document from the item information. The score calculation unit 104 then calculates the sum of those ratings, and sets the sum value as the rating of each document for the retrieval condition.

P004 is the only fulfilling item set in D001 shown in FIG. 22 which fulfills "security AND market trend". Further, referring to the item information in FIG. 17, it is apparent that the rating of the items in D001 is 5. Therefore, the rating of the items directly becomes the rating of the document.

Figure 26:
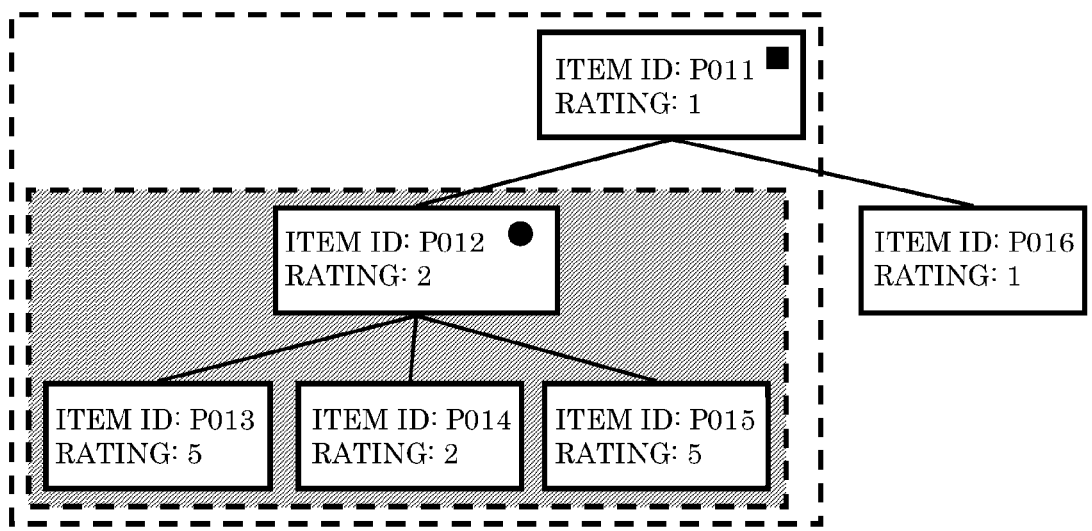
FIG. 26 is a conceptual diagram showing an example of a document when there is a set of fulfilling items.
Figure 27:
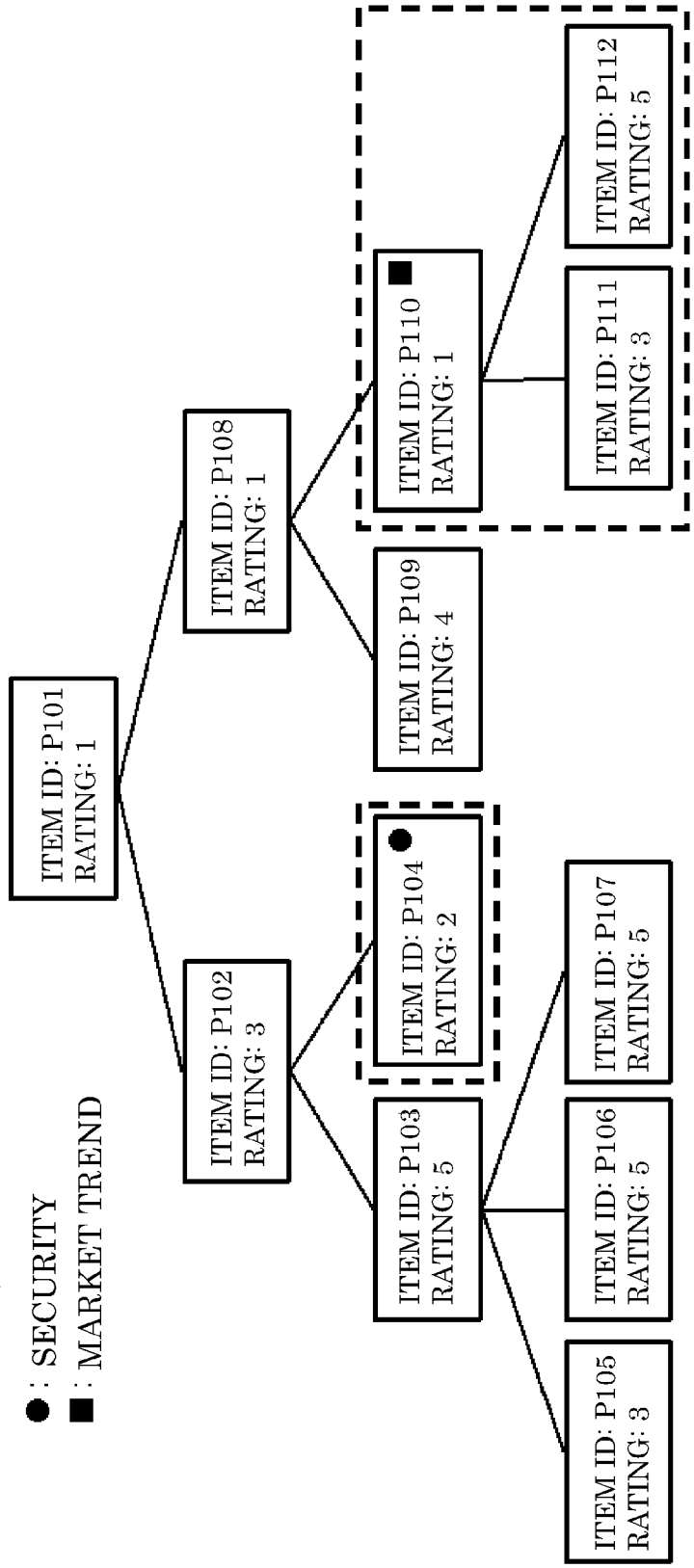
FIG. 27 is a conceptual diagram showing an example of a document when there is not a set of fulfilling items.

FIGS. 26 and 27 show examples of the hierarchical structures of documents D003 and D005 shown in FIG. 22. One node shown in FIGS. 26 and 27 corresponds to one item, and has an item ID and the rating of the item described therein. The sums of the ratings of all the items in D003 and D005 become 16 and 38, respectively. Therefore, the rating of D005 is higher in the entire document. Attention is now paid to the fulfilling item set. In FIG. 26, there are four fulfilling item sets, P012, P013, P014 and P015. Therefore, the rating of the document is 14 which is the sum of their ratings.

There is not a fulfilling item set in D005 in FIG. 27. Therefore, the rating of the document becomes 0. According to the system, therefore, D003 can be ranked higher with respect to the retrieval condition. When a key word is contained in the items shown in FIG. 27 in the chapter structure as shown in the diagram, it hardly seems that the topic of "market trend on security" is described in D005. It is therefore possible to determine that the rating of D005 for the retrieval condition being 0 is proper. However, whether or not to display a document with a document rating of 0 as the final retrieval result has only to be decided by the manager of the document retrieval system 20.

Although the rating of a document is calculated from the sum of the ratings of the items contained in the fulfilling item set in the above example, another calculation method may be used in the calculation of the document rating. One example of such a calculation method is to divide the sum of the ratings of the items contained in the fulfilling item set by the number of the fulfilling item sets. According to the calculation method, a document with a higher rating per item contained in a fulfilling item set can be ranked higher. For example, the document rating of a single item is 5 in the example of FIG. 21. By way of contrast, the sum of the document ratings of four items is 4 in the example of FIG. 26, so that the document rating per item is 3.5. If the document rating is calculated based on the sum of the ratings of the items, therefore, D003 is ranked higher. If the document rating per item is calculated, however, D001 is ranked higher. It is to be noted that when a fulfilling item set is a blank set, the document rating is 0.

As another calculation method, the ratio of the sum of the ratings of all the items in a document to the sum of the ratings of the individual fulfilling item sets may be used. According to this calculation method, it is possible to rank a document based on the criterion specifying how much contents relating to the retrieval condition are contained in an entire document. This is regarded as a specialty level for the retrieval condition for the document because if the overall document relates to the retrieval condition, it is probable to judge that the document uses multiple pages for the retrieval condition for the targets and elaborates the contents on the retrieval condition. In the example of FIG. 21, for example, the rating of the rating of the entire document is 16, and the rating of the of the fulfilling item set is 14, so that the ratio becomes 0.875. That is, the according to the calculation method, D003 is ranked higher than D001. When the sum of the ratings of all the items in a document is 0, the rating of the document is 0.

It is to be noted that calculation of the document rating need not be limited to any single method, but all of the aforementioned calculations may be carried out. In this case, the weighted average of a plurality of ratings may be calculated, or a searcher may select which calculation to use himself/ herself.

Specifically, the output unit 302 is achieved by a CPU in an computer which operates according to a program (e.g., an information processing apparatus which runs according to a program). The output unit 302 outputs document names in the order of the scores obtained by the score calculation unit 104. For example, the output unit 302 displays documents using a display device, such as a display.

FIG. 28 shows an example of the display screen of the retrieval results. The retrieval results may be displayed document by document, or displayed item by item. FIG. 28 shows a head 517 of an item which is most relevant to the retrieval condition is displayed at one side of the document title. The most relevant item is an item show rating is the highest in the fulfilling item set of each document. At this time, a document name is hyperlinked to the location saving the document, so that a searcher can easily access the document. The score of each document may be displayed together with the retrieval results. This can allow the user to instinctively judge that how important a document is.

Figure 29:
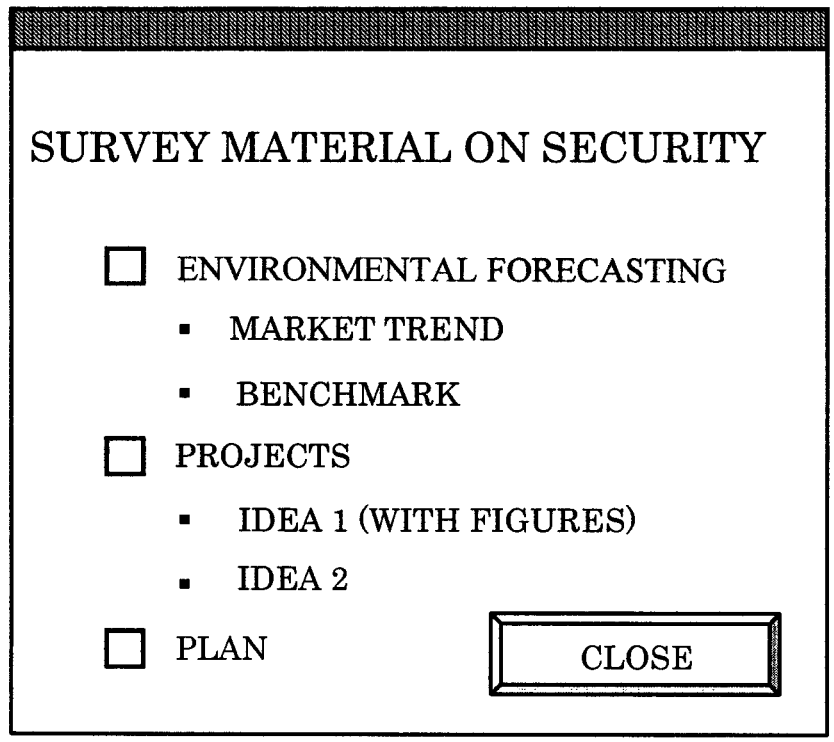
FIG. 29 is a diagram showing an example of the display of the table of contents.

Further, like a table-of-contents button 518 in FIG. 28, a function of displaying the dependency between the specified items may be provided. According to the embodiment, the dependency between items has a hierarchical structure like the table of contents. Therefore, the table-of-contents buttons 518 are arranged as illustrated, and when any one of the buttons is clicked, the hierarchical relation among the items may be reproduced based on the subordinate items of the clicked document, and table-of-contents information as shown in FIG. 29 may be displayed. Since this function allows a searcher to have a look-down view of the outline of the document, so that the searcher can determine whether needed information is described in a document resulting from the retrieval without detailed examination.

Figure 30:
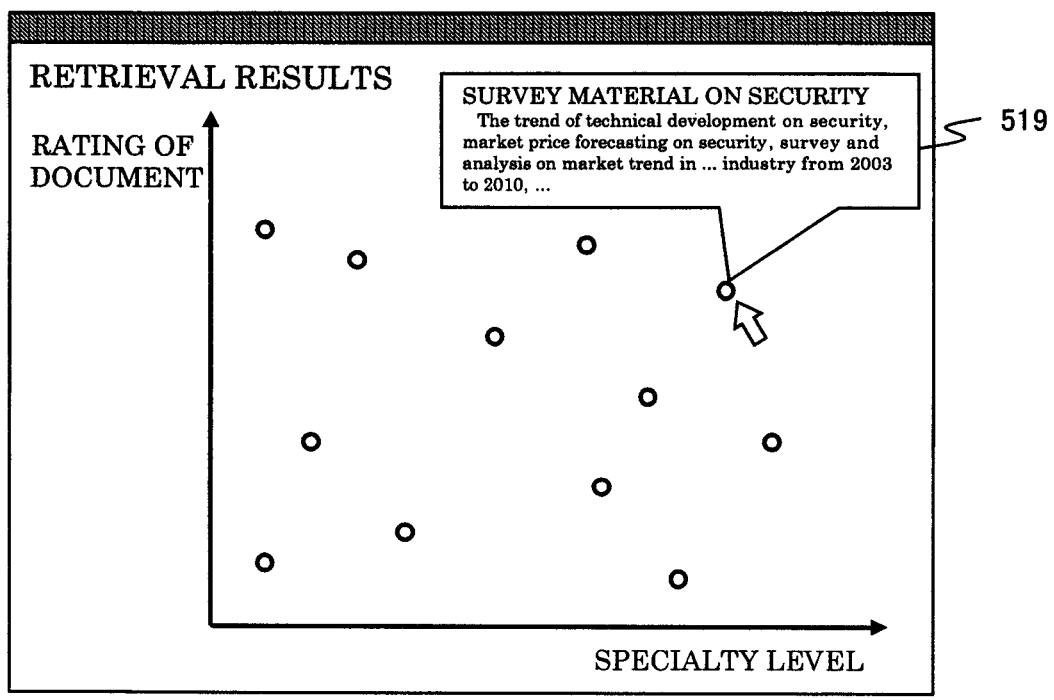
FIG. 30 is a diagram showing an example of the display of the results of document retrieval based on a document rating and specialty level.

Further, a display mode as shown in FIG. 30 may be used. FIG. 30 shows how to display of the results of document retrieval based on two scores, namely the document rating and specialty level, set on the axes axes. The document rating is a score the score calculation unit 104 obtains from the sum of the ratings of the individual items in the fulfilling item set. The specialty level, like the document rating, is a score the score calculation unit 104 obtains from the ratio of the sum of the ratings of all the items in the document to the document rating. The score calculation unit 104 obtains those two scores, and outputs the results to the output unit 302. The output unit 302 decides the display positions of the individual documents using the scores. In FIG. 30, points displayed in the space defined by the two axes represent documents. The higher the position of a point is, the higher the rating is, and the more rightward the position of a point is, the higher the specialty level is.

A document displayed upper right in the coordinates has multiple fulfilling item sets for the retrieval condition, and has descriptions on the retrieval condition in its entirety. Therefore, the documents displayed upper right in the coordinates can be judged as documents for a searcher who wants detailed information on the retrieval condition.

On the other hand, a documents displayed lower right in the coordinates can be regarded as a document which does not have a lot of contents the most of which is related to the retrieval condition. The documents displayed lower right in the coordinates can be judged as documents for a searcher who needs brief information on the retrieval condition. Further, a dictionary-like document which has an abundance of descriptions of information on the retrieval condition and other information is likely to be displayed upper left in the coordinates. Therefore, the documents displayed upper left in the coordinates are documents for a searcher who wants knowledge on the retrieval condition and peripheral knowledge thereon.

As apparent from the above, using the display mode as shown in FIG. 30, the searcher easily retrieves a document which matches information the searcher wants. In addition, a document outline 519 may be made to be shown as shown in FIG. 30 by positioning a mouse cursor at a point representing a document arranged in the coordinates.

Figure 31:
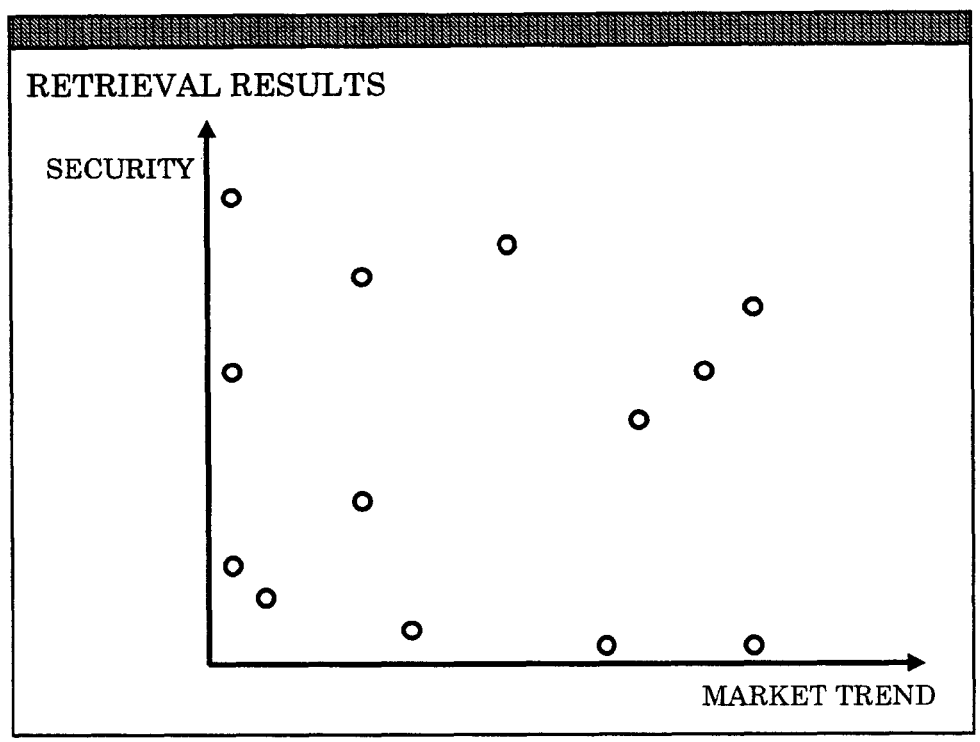
FIG. 31 is a diagram showing an example of the display of document retrieval results on a two-dimensional coordinate plane having the document rating for a retrieval item on an axis.

Further, a display mode as shown in FIG. 31 may be used. According to the example of FIG. 31, when the retrieval condition is "security AND market trend", document ratings are respectively obtained for security and market trend, and documents are plotted on a two-dimensional plane using the document ratings. On the plane in FIG. 31, the upper right part includes detailed documents on "security" and "market trend", the upper left part includes detailed documents on "security", the lower right part includes detailed documents on "market trend", and the lower left part includes documents which do not have particulars on either of "security" and "market trend". To display such coordinates, it is necessary to execute the following processes in the fulfilling item set specifying unit 103 and the score calculation unit 104.

The fulfilling-item set specifying unit 103 obtains a fulfilling item set after specifying related items for each retrieval item. In the middle stage, therefore, the fulfilling-item set specifying unit 103 can specify a fulfilling item set for each retrieval item and a fulfilling item set for a partial retrieval condition which is a part extracted from the retrieval condition. Since the score calculation unit 104 can calculate a document rating for any fulfilling item set, it can calculate a document rating for each retrieval item and a document rating for a partial retrieval condition. Accordingly, as the document rating for a partial retrieval condition obtained by breaking down the retrieval condition or the document ratings for the retrieval items are output to the output unit 302, the coordinates shown in FIG. 31 can be displayed.

To display the coordinates for a searcher to easily view, it is desirable to break down a retrieval condition into two or so. If OR is included in the retrieval condition, the retrieval condition has only to be broken down at the location where OR is included. Suppose that "(network OR security) AND market trend" is given as the retrieval condition. This retrieval condition is synonymous to "(network AND market trend) OR (security AND market trend)". Therefore, document ratings for two partial retrieval conditions "network AND market trend" and "security AND market trend" are obtained. Then, documents are displayed on the coordinate plane based on the two document ratings. The document retrieval unit 102 breaks down the retrieval condition.

Figure 32:
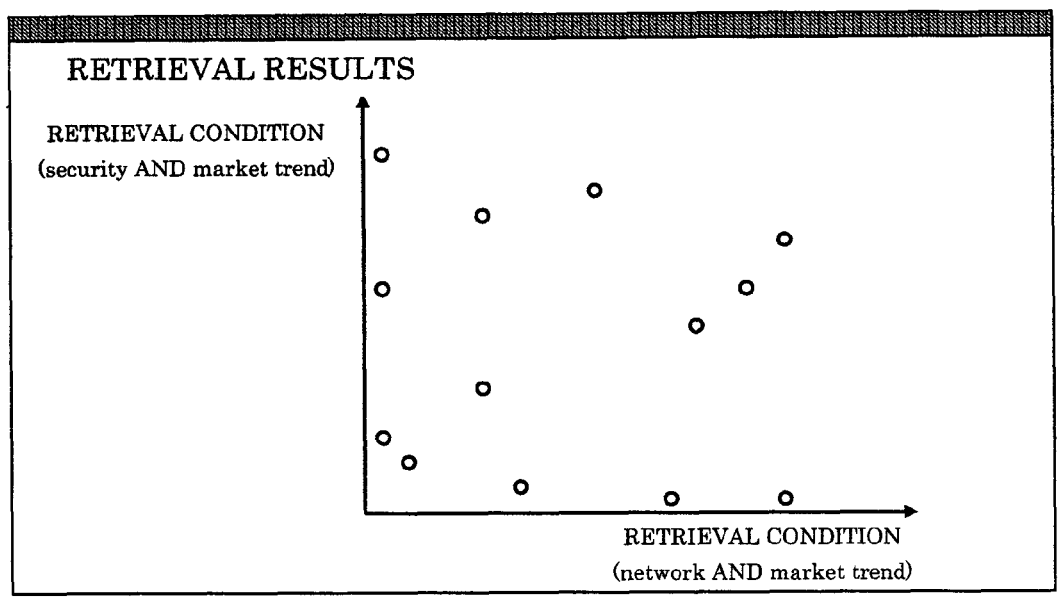
FIG. 32 is a diagram showing an example of the display of document retrieval results on a two-dimensional coordinate plane having the document rating for a partial retrieval condition.

FIG. 32 shows a display mode which is similar to the one in FIG. 31, and shows an example where the aforementioned "network AND market trend" and "security AND market trend" as the axes. When the individual axes are in the relation of OR as shown in FIG. 32 in the display mode, documents plotted upper left and lower right on the two-dimensional plane are detailed documents on "network AND market trend" and "security AND market trend", respectively. Therefore, those documents are what are demanded by the original retrieval condition. Further, documents plotted upper right are detailed documents on the "market trend" of "security and network". Therefore, the documents plotted upper right have two pieces of information to be retrieved described in one document. As the are what are demanded by the original retrieval condition. As the axes that define the plotting space are in the relation of OR, a searcher can have a look-down view of the existence of a detailed document on each of the partial retrieval conditions and a detailed documents on both retrieval conditions, thus ensuring efficient document retrieval.

Second Embodiment

Figure 33:
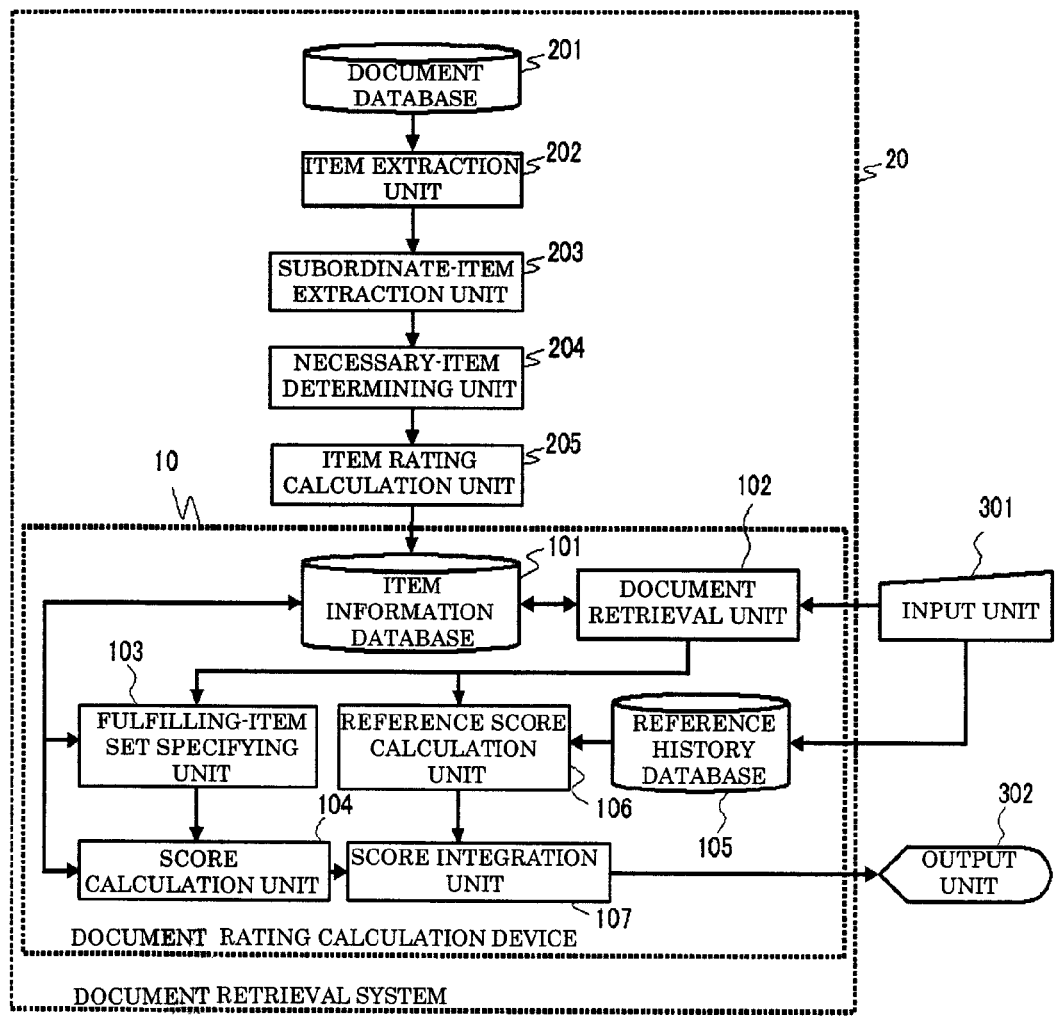
FIG. 33 is a block diagram showing an example of the configuration of a document retrieval system according to a second embodiment of the invention.

The description of the second embodiment, like that of the first embodiment, will be given of the operation of the document rating calculation device 10 according to the invention. FIG. 33 is a block diagram showing an example of the configuration of a document retrieval system 20 according to the second embodiment. According to the embodiment, as shown in FIG. 33, the document rating calculation device 10 differs from the first embodiment in including a reference history database 105, a reference score calculation unit 106 and a score integration unit 107 in addition to the components shown in FIG. 2.

Since the rating of a document is obtained based on the abundance of substantial contents with respect to a retrieval condition according to the first embodiment, a document having detailed descriptions with respect to the retrieval condition is basically ranked higher. A document containing a lot of information desired by a searcher is useful for the searcher. However, searchers are likely to select a document in such documents which has desirable information put together into a proper volume. The second embodiment is characterized in that such a tendency of choice of a searcher is calculated based on the reference history of the searcher, and is reflected on the rating of a document.

The reference history database 105 stores the date on which document retrieval has been carried out, the retrieval condition used in the retrieval, accessed documents and so fourth.

FIG. 34 shows an example of reference history information. The reference history information includes the date and time at which each document has been accessed, the retrieval condition used in the retrieval, and the document IDs of accessed documents. In addition, a log of a person who has accessed a document may be recorded. The reference history information may be stored automatically by a computer or the like, or may be directly input, corrected and deleted by a person.

The reference score calculation unit 106 obtains the results of document retrieval from the document retrieval unit 10, and refers to the reference history database 105. The reference score calculation unit 106 then calculates the ratings of documents resulting from the retrieval, and outputs the results to the score integration unit 107.

Based on the reference history, the reference score calculation unit 106 calculates a score which ranks a document referred to by a number of times higher. The simplest calculation method is to quantize the number of times a document has been referred to. The rating of a document obtained by the reference score calculation unit 106 is called "reference score". FIG. 35 shows a process of obtaining a reference score based on the reference history. Only reference history information 521 relating to the retrieval results is extracted from reference history information 520. FIG. 35 shows a case where the results of a retrieval are D001, D002 and D003. The number of document IDs in the reference history is counted document ID by document ID to obtain a reference number. This reference number is a reference score 522. In the example of FIG. 35, the reference scores of D001, D002 and D003 are 3, 2 and 1, respectively.

In the past retrievals performed under a similar retrieval condition, as the rating of a document needed by a searcher is increased, the rank of the document which fulfills the present retrieval condition becomes higher. Only the document ID of a document which has been determined as fulfilling the retrieval condition, and the history of retrieval which is carried out under a similar retrieval condition are extracted from the reference history information. FIG. 36 shows a process of calculating a relay station using retrieval condition information. With reference history information 523 relating to the retrieval results being obtained, reference history information which fulfills the retrieval condition is further extracted. It is to be noted that the retrieval condition should not necessarily be fulfilled exactly. An orthographic variation or a synonym may be judged as the same character string, and processed as such, or the similarity of the character string may be obtained, and the character string may be judged as a match if the similarity is high. The number of document IDs in reference history information 524 which fulfills the retrieval condition too is counted document ID by document ID to obtain the reference number. In the example of FIG. 36, the reference scores of D001, D002 and D003 are 0, 2 and 1, respectively. While this example uses a similar reference history, its score differs.

With a sufficient amount of the reference history, the reference score calculated based on the similarity of the retrieval condition becomes the rating of a document which is more relevant to the retrieval condition than the reference score calculated based only on the reference number alone. The above method is typical in obtaining a reference score, but other methods may be adopted to obtain a reference score. What method to use has only to be decided by the manager of the document retrieval system 20.

The score integration unit 107 obtains a document rating based on the fulfilling item set and a document rating based on the reference history from the score calculation unit 104 and the reference score calculation unit 106. The score integration unit 107 then obtains a document rating which is the document ratings integrated, and outputs the result to the output unit 302. Here, the score obtained by the score calculation unit 104 is called "item score" for the sake of convenience.

First, the score integration unit 107 normalizes the item score and the reference score in such a way that the maximum value becomes 1 and the minimum value becomes 0. FIG. 37A shows an example of the normalized item score and reference score. A table 526 in FIG. 37A illustrates individual normalized item scores and reference scores side by side for the respective documents obtained as the retrieval results.

Next, the score integration unit 107 obtains the weighted averages of those scores, and finally calculates the document ratings for ranking documents. An equation for calculating the ratings is given by an equation 3.

$$\text{document rating} = \alpha \times \text{item score} + \beta \times \text{reference score} \quad (3)$$

where $\alpha$ and $\beta$ are parameters to respectively determine which one of the item score and the reference score should have priority over the other.

Figure 38:
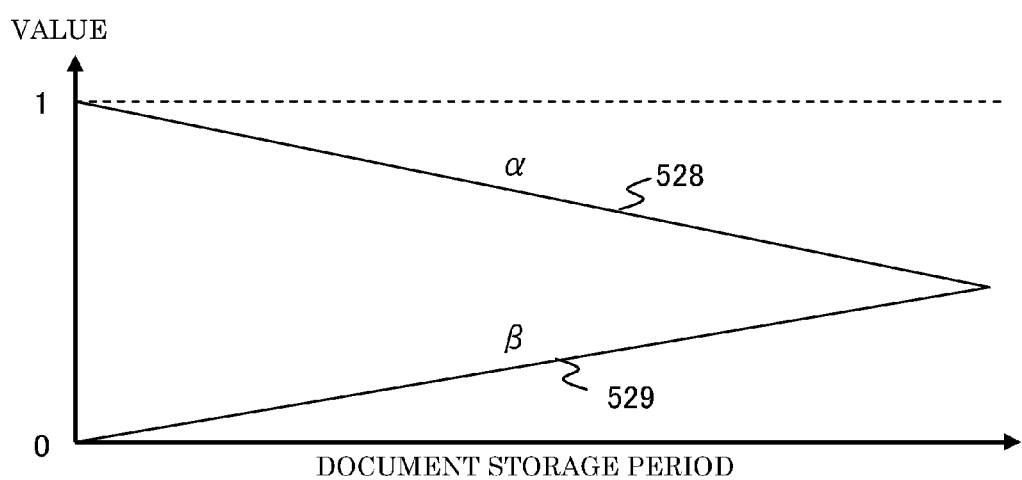
FIG. 38 is a conceptual diagram showing an example where a document storage period parameter is changed.

The reference score is not much reliable until the reference history is sufficiently stored. With regard to a document just stored, therefore, the item score should better be taken into account. With regard to a document which has been stored for a long period of time, the reference score should better be taken into account additionally, so that the reference score is taken into account by increasing the value of $\alpha$. FIG. 38 shows an example of changing $\alpha$ and $\beta$ based on the storage period. In this example, in case of a document having a long storage period, the parameters are set in such a way that $\alpha$ 528 is decreased and $\beta$ 529 is increased. As $\alpha$ and $\beta$ dynamically change according to a rule, the document rating can be calculated according to the tendency of choice of a document by the searcher. How to change $\alpha$ and $\beta$ is optional, and has only to be decided by the manager of the document retrieval system 20 or a searcher.

Figure 37B:
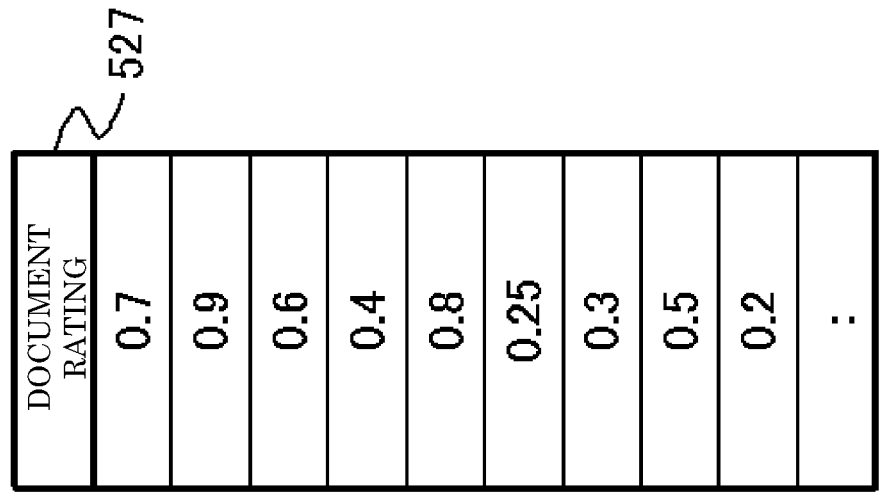
FIGS. 37A and 37B are conceptual diagrams showing an example of calculation of the rating of a document based on an item score and reference score.
Figure 37A:
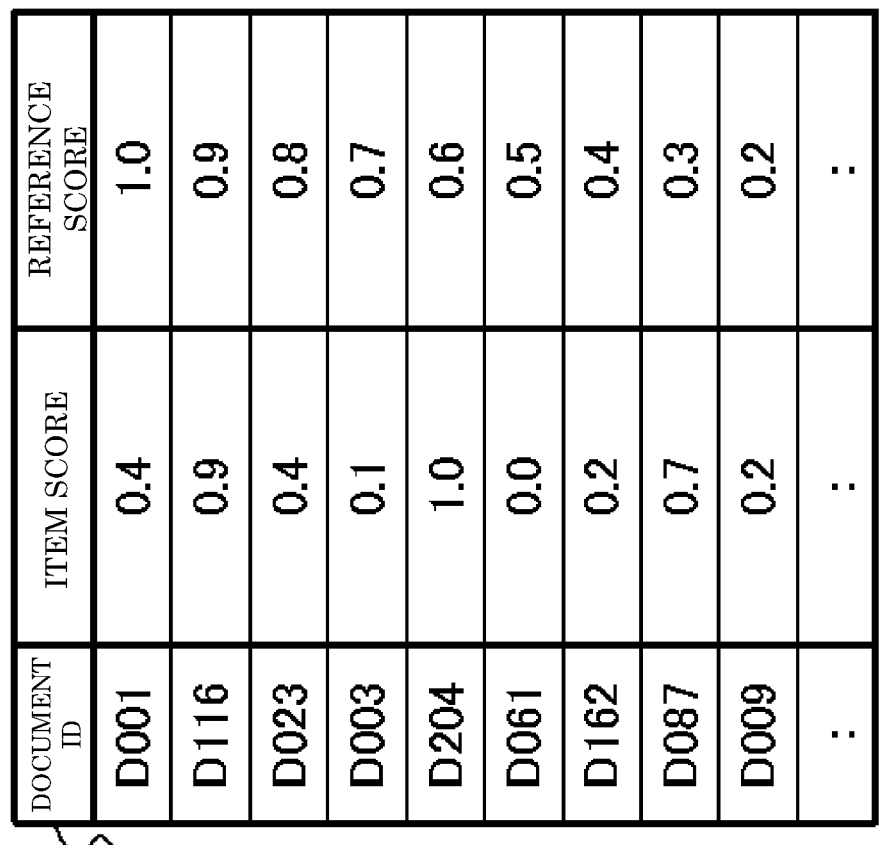

A table 527 in FIG. 37B shows a document rating obtained when the item score and reference score in the table 526 in FIG. 37A are respectively set to $\alpha=0.5$ and $\beta=0.5$. Ranking has only to be made according to the document ratings obtained in the score integration process, and the results has only to be displayed. The method of calculating the document ratings may be carried out using an equation other than the equation 3.

Alternatively, the score integration unit 107 may output the item score and reference score to the output unit 302 without calculating the document ratings using the item score and reference score. At this time, the retrieval results can be displayed on a two-dimensional map with the individual scores regarded as coordinates with the item score and reference score taken on the axes.

Figure 39:
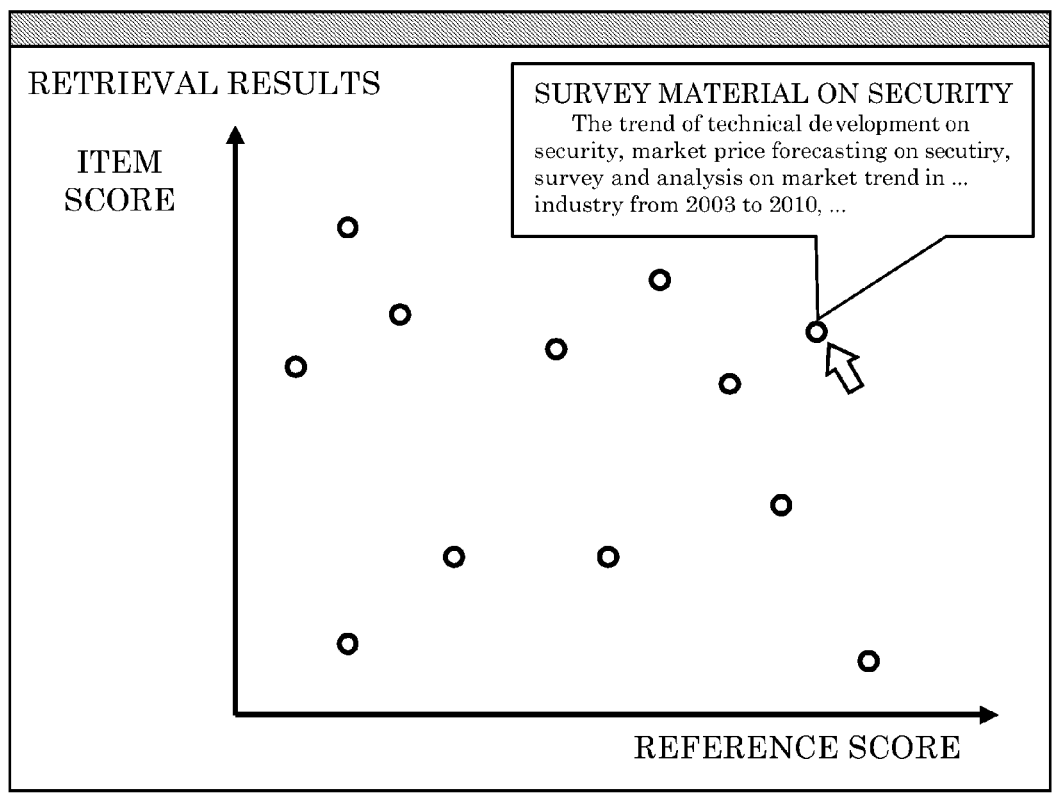
FIG. 39 is a diagram showing an example of the display of the results of document retrieval using an item score and reference score.

Documents arranged in the upper right area in FIG. 39 are documents which contain an abundance of contents relating to the retrieval condition and is viewed by many searchers. Documents arranged in the upper left area are documents which contain a lot of information on the retrieval condition but is viewed by fewer searchers. A newly registered document is arranged in this area. Documents arranged in the lower right area are documents whose reference numbers are large while having fewer items relating to the retrieval condition.

This display mode can allow a searcher to perform document retrieval while having a general look-down view of the document ratings. Further, the outline of a document arranged in the coordinates may be made to be viewable as shown in FIG. 39 if the searcher positions the mouse cursor at a point representing the document.

It is to be noted that the document rating calculation device 10 and the document retrieval system 20 explained in the descriptions of the embodiments are merely examples, and can be changed and modified arbitrarily. The configurations of the embodiments described above are not only the configurations of the document rating calculation device 10 and the document retrieval system 20, and are not restrictive.

This application is based on Japanese Patent Application No. 2007-267147 filed on Oct. 12, 2007. The specification, claims, and drawings of the Japanese Patent Application No. 2007-267147 are incorporated herein by reference in their entirety.

INDUSTRIAL APPLICABILITY

The invention is effectively used by a searcher to easily retrieve documents containing necessary information.

The invention claimed is:

1. A document rating calculation system comprising:
a first information processing apparatus including,
an item information database that stores a mutual dependent relationship based on topics represented by each item, among the items into which a document is divided and a rating for each of the items which is calculated based on a predetermined criterion;
    a document retrieval unit that electronically retrieves a document fulfilling a given retrieval condition, and, for each condition item of the retrieval condition, specifies an item fulfilling the condition item in the retrieved document;
    a related item selection unit that, for each condition item of the retrieval condition, i) specifies an item related to the item fulfilling the condition item for each item fulfilling the condition item and specified by the document retrieval unit in the document retrieved by the document retrieval unit, based on the mutual dependent relationship among the items which is stored in the item information database, and ii) selects a set of related items including the item fulfilling the condition item and the item specified and related to the item fulfilling the condition item;
    a fulfilling-item set specifying unit that performs a logical operation of the retrieval condition between sets of related items selected by the related item selection unit to specify a set of items fulfilling the retrieval condition; and
    a score calculation unit that calculates a document rating of the document fulfilling the retrieval condition based on the ratings of items stored in the item information database and included in the set of fulfilling items specified by the fulfilling-item set specifying unit,
wherein the item information database stores a value calculated based on a predetermined degree of account for a number of elements included in an item of the document and a type of the elements, as the rating of the item,
wherein the types of elements included in the items of the document include any combination of a sentence, a figure, a table, an equation, an emphasis expression, a citation and a key word, and
the item information database stores a value calculated based on a sum of product of a number of elements for each of the types of the elements included in the items of the document, a predetermined index for each of the types of the elements, and a predetermined weight set for the index, as a rating for each of the items.

2. The document rating calculation system according to claim 1, wherein for each item included in a document having a hierarchical structure of items, the item information database stores, as the mutual dependent relationship among the items, a subordinate item set which is a set of items included in a lower class in the hierarchical structure and including said each item as a top, and for each item fulfilling the condition item of the retrieval condition, the related item selection unit selects that item and the subordinate item set thereof as a set of related items.

3. The document rating calculation system according to claim 2, wherein for each item included in a document having a hierarchical structure of items, the subordinate item set optionally including an arbitrary item besides a subordinate item included in a lower class in the hierarchical structure and including said each item as a top.

4. The document rating calculation system according to claim 1, wherein the item information database uses a bit array having bits assigned to all items included in the document to store a set of related items relating to each of the items as a value of a bit assigned to the item.

5. The document rating calculation system according to claim 1, wherein when the logical operation for the condition item of the retrieval condition includes a NOT operation, the document retrieval unit does not exclude a document which includes a condition item to be subjected to the NOT operation and another condition item from a selection target of the related item selection unit.

6. The document rating calculation system according to claim 1, wherein the score calculation unit sets a sum of ratings of items included in a set of related items fulfilling the retrieval condition and stored in the item information database to a document rating of a document fulfilling the retrieval condition.

7. The document rating calculation system according to claim 1, wherein the score calculation unit sets an average value obtained by dividing a sum of ratings of items included in a set of related items fulfilling the retrieval condition and stored in the item information database by a number of items in the set of related items fulfilling the retrieval condition to a document rating of a document fulfilling the retrieval condition.

8. The document rating calculation system according to claim 1, wherein the score calculation unit sets a ratio of a sum of ratings of items included in a set of related items fulfilling the retrieval condition and stored in the item information database to a total of ratings of all items in the document to a document rating of a document fulfilling the retrieval condition.

9. The document rating calculation system according to claim 1, further comprising:
    an item extraction unit that extracts character strings corresponding to individual heads in a table of contents included in the document from the document, and divides the document into items corresponding to the heads; and
    an item relation setting unit that specifies a hierarchical relation among the items based on text information, positional information or decoration information of each item in the table of contents, or a combination of those information.

10. The document rating calculation system according to claim 1, further comprising a necessary item determining unit that specifies a predetermined item in the document which does not influence the document rating of the document, and excludes the item from candidates whose document ratings are to be calculated.

11. The document rating alculation system according to claim 10, wherein the item information database of the first information processing apparatus uses a bit array having bits assigned to all items included in the document to store a set of related items relating to each of the items as a value of a bit assigned to the item, and
    the necessary item determining unit changes a bit in the bit array which corresponds to an item which does not influence a rating of a document to a value indicating that the bit is not used in calculation of the document rating.

12. The document rating calculation system according to claim 1, wherein the score calculation unit sets a sum of ratings of items included in a set of related items fulfilling the retrieval condition and stored in the item information database to a document rating of a document fulfilling the retrieval condition, and calculates a specialty level which is a ratio of the document rating to a sum of ratings of the all the items of the document, and the document rating calculation system comprises specialty level outputting unit that displays a position of a document fulfilling the retrieval condition on a two-dimensional coordinate plane having the document rating and the specialty level on axes, based on the document rating and the specialty level.

13. The document rating calculation system according to claim 1, wherein the item information database stores a document reference history for each document, and the document rating calculation system comprises:

reference score calculation unit that calculates a reference rating of a document based on the reference history of a document fulfilling the retrieval condition which is retrieved by the retrieval unit; and score integration unit that integrates the document rating calculated by the score calculation unit and the reference rating calculated by the reference score calculation unit to calculate an integrated rating of the document.

14. The document rating calculation system according to claim 13, wherein the score calculation unit calculates the document rating based on a sum of ratings of items included in a set of related items fulfilling the retrieval condition and stored in the item information database, the reference score calculation unit calculates the reference rating based on a number of times the document has been referred, and the score integration unit calculates the integrated rating by multiplying values of the document rating and the reference rating that are respectively normalized with predetermined criteria by a weight, and adding the weighted values.

15. The document rating calculation system according to claim 13, wherein the score calculation unit calculates the document rating based on a sum of ratings of items included in a set of related items fulfilling the retrieval condition and stored in the item information database, the reference score calculation unit calculates the reference rating based on a number of times the document has been referred, and the score integration unit calculates the integrated rating by multiplying values of the document rating and the reference rating that are respectively normalized with predetermined criteria by a weight which changes according to a creation time of the document, and adding the weighted values.

16. The document rating calculation system according to claim 13, wherein the score calculation unit calculates the document rating based on a sum of ratings of items included in a set of related items fulfilling the retrieval condition and stored in the item information database, the reference score calculation unit calculates the reference rating based on a number of times the document has been referred, and the document rating calculation system comprises integrated rating outputting unit that displays a position of a document fulfilling the retrieval condition on a two-dimensional coordinate plane having the document rating and the reference rating on axes, based on the document rating and the reference rating.

17. A document rating calculation method comprising:

in a first information processing apparatus a document retrieval step of electronically retrieving a document fulfilling a given retrieval condition from a database storage medium for documents divided into items, and, for each condition item of the retrieval condition, specifying an item fulfilling the condition item in the retrieved document;

a related item selection step, for each condition item of the retrieval condition, i) of specifying an item related to the item fulfilling the condition item for each item fulfilling the condition item and specified in the document retrieval step in the document retrieved by the document retrieval step, based on a mutual dependent relationship based on topics represented by each item among the items, which is stored in the item information database storing a mutual dependent relationship among items into which a document is divided and a rating for each of the items which is calculated based on a predetermined criterion, and ii) of selecting a set of related items including the item fulfilling the condition item and the item specified and related to the item fulfilling the condition item;

a fulfilling-item set specifying step of performing a logical operation of the retrieval condition between sets of related items selected in the related item selection step to specify a set of items fulfilling the retrieval condition; and a score calculation step of calculating a document rating of the document fulfilling the retrieval condition based on the ratings of items stored in the item information database and included in the set of fulfilling items specified in the fulfilling-item set specifying step, wherein the score calculation step calculates a document rating of a document fulfilling the retrieval condition based on a rating calculated based on a predetermined degree of account for a number of elements included in an item of the document and a type of the elements, wherein the types of elements included in the items of the document include any combination of a sentence, a figure, a table, an equation, an emphasis expression, a citation and a key word, and wherein the score calculation step calculates the document rating of a document fulfilling the retrieval condition further based on a rating calculated based on a sum of product of a number of elements for each of the types of the elements included in the items of the document, a predetermined index for each of the types of the elements, and a predetermined weight set for the index.

18. The document rating calculation method according to claim 17, wherein for each item in a document having a hierarchical structure of items and fulfilling the condition item of the retrieval condition, the related item selection step selects, as the set of related items, a subordinate item set which is a set of items included in a lower class in the hierarchical structure and including that each item as a top.

19. The document rating calculation method according to claim 18, wherein the related item selection step optionally includes an arbitrary item besides a subordinate item included in a lower class in the hierarchical structure and including said each item as a top, as the set of related items for each item fulfilling the condition item of the retrieval condition.

20. The document rating calculation method according to claim 17, wherein the related item selection step uses the mutual dependent relationship among the items, which is represented by a value of a bit array having bits assigned to all items included in the document to select a set of related items relating to each of the items fulfilling the condition item of the retrieval condition.

21. The document rating calculation method according to claim 17, wherein when the logical operation for the condition item of the retrieval condition includes a NOT operation, the document retrieval step does not exclude a document which includes a condition item to be subjected to the NOT operation and another condition item from a selection target in the related item selection step.

22. The document rating calculation method according to claim 17, wherein the score calculation step sets a sum of ratings of items included in a set of related items fulfilling the retrieval condition and stored in the item information database to a document rating of a document fulfilling the retrieval condition.

23. The document rating calculation method according to claim 17, wherein the score calculation step sets an average value obtained by dividing a sum of ratings of items included in a set of related items fulfilling the retrieval condition and stored in the item information database by a number of items in the set of related items fulfilling the retrieval condition to a document rating of a document fulfilling the retrieval condition.

24. The document rating calculation method according to claim 17, wherein the score calculation step sets a ratio of a sum of ratings of items included in a set of related items fulfilling the retrieval condition and stored in the item information database to a total of ratings of all items in the document to a document rating of a document fulfilling the retrieval condition.

25. The document rating calculation method according to claim 17, further comprising:
an item extraction step of extracting character strings corresponding to individual heads in a table of contents included in the document from the document, and dividing the document into items corresponding to the heads; and
an item relation setting step of specifying a hierarchical relation among the items based on text information, positional information or decoration information of each item in the table of contents, or a combination of those information.

26. The document rating calculation method according to claim 17, further comprising a necessary item determining step of specifying a predetermined item in the document which does not influence the document rating of the document, and excluding the item from candidates whose document ratings are to be calculated.

27. The document rating calculation method according to claim 26, wherein the necessary item determining step changes a bit corresponding to an item which does not influence a rating of a document and included in a bit array having bits assigned to all items included in the document, to a value indicating that the bit is not used in calculation of the document rating.

28. The document rating calculation method according to claim 17, wherein the score calculation step sets a sum of ratings of items included in a set of related items fulfilling the retrieval condition and stored in the item information database to a document rating of a document fulfilling the retrieval condition, and calculates a specialty level which is a ratio of the document rating to a sum of ratings of the all the items of the document, and
the document rating calculation method comprises a specialty level outputting step of displaying a position of a document fulfilling the retrieval condition on a two-dimensional coordinate plane having the document rating and the specialty level on axes, based on the document rating and the specialty level.

29. The document rating calculation method according to claim 17, wherein the item information database stores a document reference history for each document, and
the document rating calculation method comprises:
a reference score calculation step of calculating a reference rating of a document based on the reference history of a document fulfilling the retrieval condition which is retrieved in the retrieval step; and
a score integration step of integrating the document rating calculated in the score calculation step and the reference rating calculated in the reference score calculation step to calculate an integrated rating of the document.

30. The document rating calculation method according to claim 29, wherein the score calculation step calculates the document rating based on a sum of ratings of items included in a set of related items fulfilling the retrieval condition and stored in the item information database,
the reference score calculation step calculates the reference rating based on a number of times the document has been referred, and
the score integration step calculates the integrated rating by multiplying values of the document rating and the reference rating that are respectively normalized with predetermined criteria by a weight, and adding the weighted values.

31. The document rating calculation method according to claim 29, wherein the score calculation step calculates the document rating based on a sum of ratings of items included in a set of related items fulfilling the retrieval condition and stored in the item information database,
the reference score calculation step calculates the reference rating based on a number of times the document has been referred, and
the score integration step calculates the integrated rating by multiplying values of the document rating and the reference rating that are respectively normalized with predetermined criteria by a weight which changes according to a creation time of the document, and adding the weighted values.

32. The document rating calculation method according to claim 29, wherein the score calculation step calculates the document rating based on a sum of ratings of items included in a set of related items fulfilling the retrieval condition and stored in the item information database,
the reference score calculation step calculates the reference rating based on a number of times the document has been referred, and
the document rating calculation system comprises an integrated rating outputting step of displaying a position of a document fulfilling the retrieval condition on a two-dimensional coordinate plane having the document rating and the reference rating on axes, based on the document rating and the reference rating.

33. A computer operating according to a data retrieval program that configures the computer to run:
a document retrieval unit that retrieves a document fulfilling a given retrieval condition from a database for documents divided into items, and, for each condition item of the retrieval condition, specifies an item fulfilling the condition item in the retrieved document;
a related item selection unit that, for each condition item of the retrieval condition, i) specifies an item related to the item fulfilling the condition item for each item fulfilling the condition item and specified by the document retrieval unit in the document retrieved by the document retrieval unit, based on a mutual dependent relationship based on topics represented by each item among the items, which is stored in the item information database storing a mutual dependent relationship among items into which a document is divided and a rating for each of the items which is calculated based on a predetermined criterion, and ii) selects a set of related items including the item fulfilling the condition item and the item specified and related to the item fulfilling the condition item;

a fulfilling-item set specifying unit that performs a logical operation of the retrieval condition between sets of related items selected by the related item selection unit to specify a set of items fulfilling the retrieval condition; and a score calculation unit that calculates a document rating of the document fulfilling the retrieval condition based on the ratings of items stored in the item information database and included in the set of fulfilling items specified by the fulfilling-item set specifying unit, wherein the item information database stores a value calculated based on a predetermined degree of account for a number of elements included in an item of the document and a type of the elements, as the rating of the item, and wherein the types of elements included in the items of the document include any combination of a sentence, a figure, a table, an equation, an emphasis expression, a citation and a key word, and the item information database stores a value calculated based on a sum of product of a number of elements for each of the types of the elements included in the items of the document, a predetermined index for each of the types of the elements, and a predetermined weight set for the index, as a rating for each of the items.

34. A document rating calculation system comprising:

an item information database that stores a mutual dependent relationship based on topics represented by each item among the items into which a document is divided and a rating for each of the items which is calculated based on a predetermined criterion;

a document retrieval unit that, for each condition item of a given retrieval condition, specifies an item fulfilling the condition item in the document;

a related item selection unit that, for each condition item of the retrieval condition, i) specifies an item related to the item fulfilling the condition item for each item fulfilling the condition item and specified by the document retrieval unit in the document retrieved by the document retrieval unit, based on the mutual dependent relationship among the items which is stored in the item information database, and ii) selects a set of related items including the item fulfilling the condition item and the item specified and related to the item fulfilling the condition item;

a fulfilling-item set specifying unit that performs a logical operation of the retrieval condition between sets of related items selected by the related item selection unit to specify a set of items fulfilling the retrieval condition; and a score calculation unit that calculates a document rating of the document based on the ratings of items stored in the item information database and included in the set of fulfilling items specified by the fulfilling-item set specifying unit, wherein the item information database stores a value calculated based on a predetermined degree of account for a number of elements included in an item of the document and a type of the elements, as the rating of the item, and wherein the types of elements included in the items of the document include any combination of a sentence, a figure, a table, an equation, an emphasis expression, a citation and a key word, and the item information database stores a value calculated based on a sum of product of a number of elements for each of the types of the elements included in the items of the document, a predetermined index for each of the types of the elements, and a predetermined weight set for the index, as a rating for each of the items.

35. A document rating calculation method comprising:

in a first information processing apparatus a document retrieval step of, for each condition item of a given retrieval condition, specifying an item fulfilling the condition item in a document divided into items;

a related item selection step, for each condition item of the retrieval condition, i) of specifying an item related to the item fulfilling the condition item for each item fulfilling the condition item and specified in the document retrieval step in the document retrieved by the document retrieval step, based on the mutual dependent relationship based on topics represented by each item among the items, which is stored in an item information database storing a mutual dependent relationship among items into which a document is divided and a rating for each of the items which is calculated based on a predetermined criterion, and ii) selects a set of related items including the item fulfilling the condition item and the item specified and related to the item fulfilling the condition item;

a fulfilling-item set specifying step of performing a logical operation of the retrieval condition between sets of related items selected in the related item selection step to specify a set of items fulfilling the retrieval condition; and a score calculation step of calculating a document rating of the document based on the ratings of items stored in the item information database and included in the set of fulfilling items specified in the fulfilling-item set specifying step, wherein the score calculation step calculates a document rating of a document fulfilling the retrieval condition based on a rating calculated based on a predetermined degree of account for a number of elements included in an item of the document and a type of the elements, wherein the types of elements included in the items of the document include any combination of a sentence, a figure, a table, an equation, an emphasis expression, a citation and a key word, and wherein the score calculation step calculates the document rating of the document fulfilling the retrieval condition further based on a rating calculated based on a sum of product of a number of elements for each of the types of the elements included in the items of the document, a predetermined index for each of the types of the elements, and a predetermined weight set for the index.

36. A computer operating according to a data retrieval program that configures the computer to run:

a document retrieval unit that, for each condition item of a given retrieval condition, specifies an item fulfilling the condition item in a document divided into items;

a related item selection unit that, for each condition item of the retrieval condition, i) specifies an item related to the item fulfilling the condition item for each item fulfilling the condition item and specified by the document retrieval unit in the document retrieved by the document retrieval unit, based on the mutual dependent relationship on topics represented by each item amount the items, which is stored in an item information database storing a mutual dependent relationship among items into which a document is divided and a rating for each of the items which is calculated based on a predetermined criterion, and ii) selects a set of related items including the item fulfilling the condition item and the item specified and related to the item fulfilling the condition item;

a fulfilling-item set specifying unit that performs a logical operation of the retrieval condition between sets of related items selected by the related item selection unit to specify a set of items fulfilling the retrieval condition; and a score calculation unit that calculates a document rating of the document based on the ratings of items stored in the item information database and included in the set of fulfilling items specified by the fulfilling-item set specifying unit, wherein the item information database stores a value calculated based on a predetermined degree of account for a number of elements included in an item of the document and a type of the elements, as the rating of the item, wherein the types of elements included in the items of the document include any combination of a sentence, a figure, a table, an equation, an emphasis expression, a citation and a key word, and the item information database stores a value calculated based on a sum of product of a number of elements for each of the types of the elements included in the items of the document, a predetermined index for each of the types of the elements, and a predetermined weight set for the index, as a rating for each of the items.

37. The document rating calculation system according to claim 1, further comprising:
an item extraction unit that extracts, from the document, information that defines a dependency between the items; and
an item relation setting unit that specifies, based on the extracted information that defines the dependency between the items, the mutual dependent relationship between the items.

38. The document rating calculation method according to claim 17, further comprising:
an item extraction step of extracting, from the document, information that defines a dependency between the items; and
an item relation setting step of specifying, based on the extracted information that defines the dependency between the items, the mutual dependent relationship between the items.

39. The computer operating according to claim 33, further comprising:
an item extraction unit that extracts, from the document, information that defines a dependency between the items; and
an item relation setting unit that specifies, based on the extracted information that defines the dependency between the items, the mutual dependent relationship between the items.

* * * * *